United States Patent
Lozano, IV

(10) Patent No.: US 9,003,672 B2
(45) Date of Patent: Apr. 14, 2015

(54) RETRACTABLE SOLAR RAILING INSTALLER AND GUIDE

(71) Applicant: Rodolfo Lozano, IV, Laredo, TX (US)

(72) Inventor: Rodolfo Lozano, IV, Laredo, TX (US)

(*) Notice: Subject to any disclaimer, the term of this patent is extended or adjusted under 35 U.S.C. 154(b) by 207 days.

(21) Appl. No.: 13/573,809

(22) Filed: Oct. 5, 2012

(65) Prior Publication Data

US 2014/0096457 A1    Apr. 10, 2014

(51) Int. Cl.
| | |
|---|---|
| G01B 3/08 | (2006.01) |
| F24J 2/52 | (2006.01) |
| B43L 13/00 | (2006.01) |
| G01C 15/10 | (2006.01) |
| G01D 21/00 | (2006.01) |
| E01B 29/04 | (2006.01) |
| G01B 5/14 | (2006.01) |
| E04B 1/00 | (2006.01) |
| E04D 15/00 | (2006.01) |
| E04F 21/00 | (2006.01) |
| E04G 21/14 | (2006.01) |

(52) U.S. Cl.
CPC .......................................... F24J 2/52 (2013.01)

(58) Field of Classification Search
USPC ........... 33/809, 404, 406, 407, 408, 410, 648, 33/649, 651.1, 810, 811, 812; 52/749.12, 52/747.1, 741.1, 750
See application file for complete search history.

(56) References Cited

U.S. PATENT DOCUMENTS

| | | | | |
|---|---|---|---|---|
| 3,492,737 | A | * | 2/1970 | Swanson .......................... 33/809 |
| 4,186,493 | A | | 2/1980 | Khan |
| 4,203,227 | A | | 5/1980 | Giroux |
| 4,566,200 | A | | 1/1986 | Brady |
| 5,546,671 | A | | 8/1996 | Kehoe |
| 5,642,569 | A | | 7/1997 | Palmer |
| 5,694,720 | A | | 12/1997 | Walcher |
| 5,735,058 | A | | 4/1998 | Jimenez |
| 5,918,439 | A | | 7/1999 | Metzer |
| 6,546,634 | B2 | | 4/2003 | Ming |
| 6,581,754 | B2 | | 6/2003 | Law |
| 6,742,271 | B1 | * | 6/2004 | Rushing .......................... 33/465 |
| 7,634,875 | B2 | | 12/2009 | Genshorek |
| 7,814,899 | B1 | | 10/2010 | Port |
| 7,971,398 | B2 | | 7/2011 | Tweedie |
| 2010/0006373 | A1 | * | 1/2010 | Bodnar .......................... 182/36 |
| 2010/0133040 | A1 | | 6/2010 | London |

* cited by examiner

*Primary Examiner* — Peter Macchiarolo
*Assistant Examiner* — Rhyan C Lange
(74) *Attorney, Agent, or Firm* — Guillermo Lava, Jr.

(57) ABSTRACT

The present invention is directed to a combination roof top solar installation tool, and more particularly, to a tool for measuring, securing, and supporting solar installation equipment to allow for quick, safe, consistent, and efficient installations. The tool may include a first housing, a second housing, and third housing that fit telescopically together and are secured through a clip locking mechanism that extends the housings when released via a clip and roller system. The tool has ruling etched along the top of the housings, a level, and also has a series of ratchet heads for tightening and loosening tools on a roof. The invention may include a series of seam clamp holes along the surface of the housings, which receive a seam clamp. The invention may also have an elongating device secured onto one of the housings, which is used for measuring distances beyond the length of the installation tool.

11 Claims, 42 Drawing Sheets

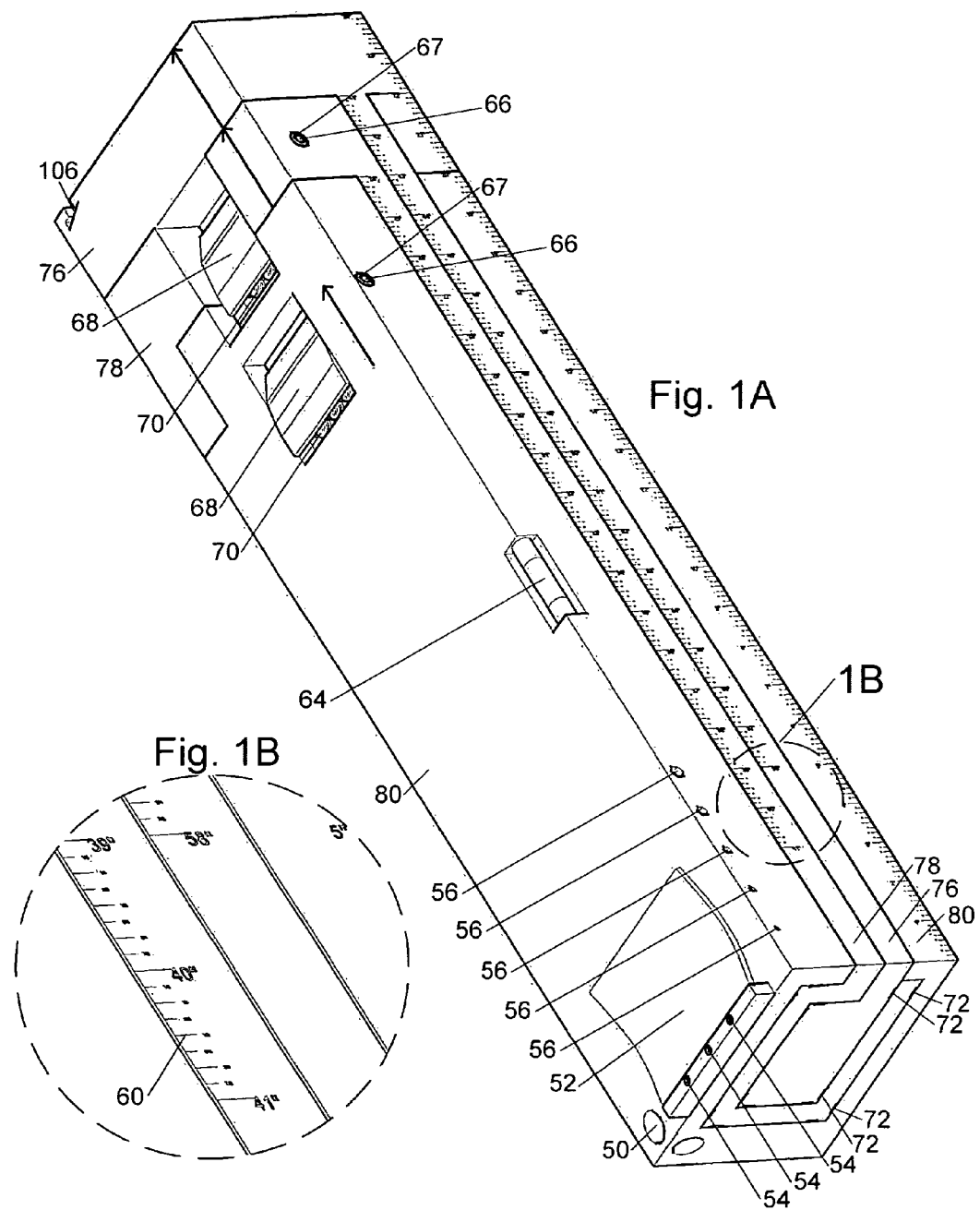

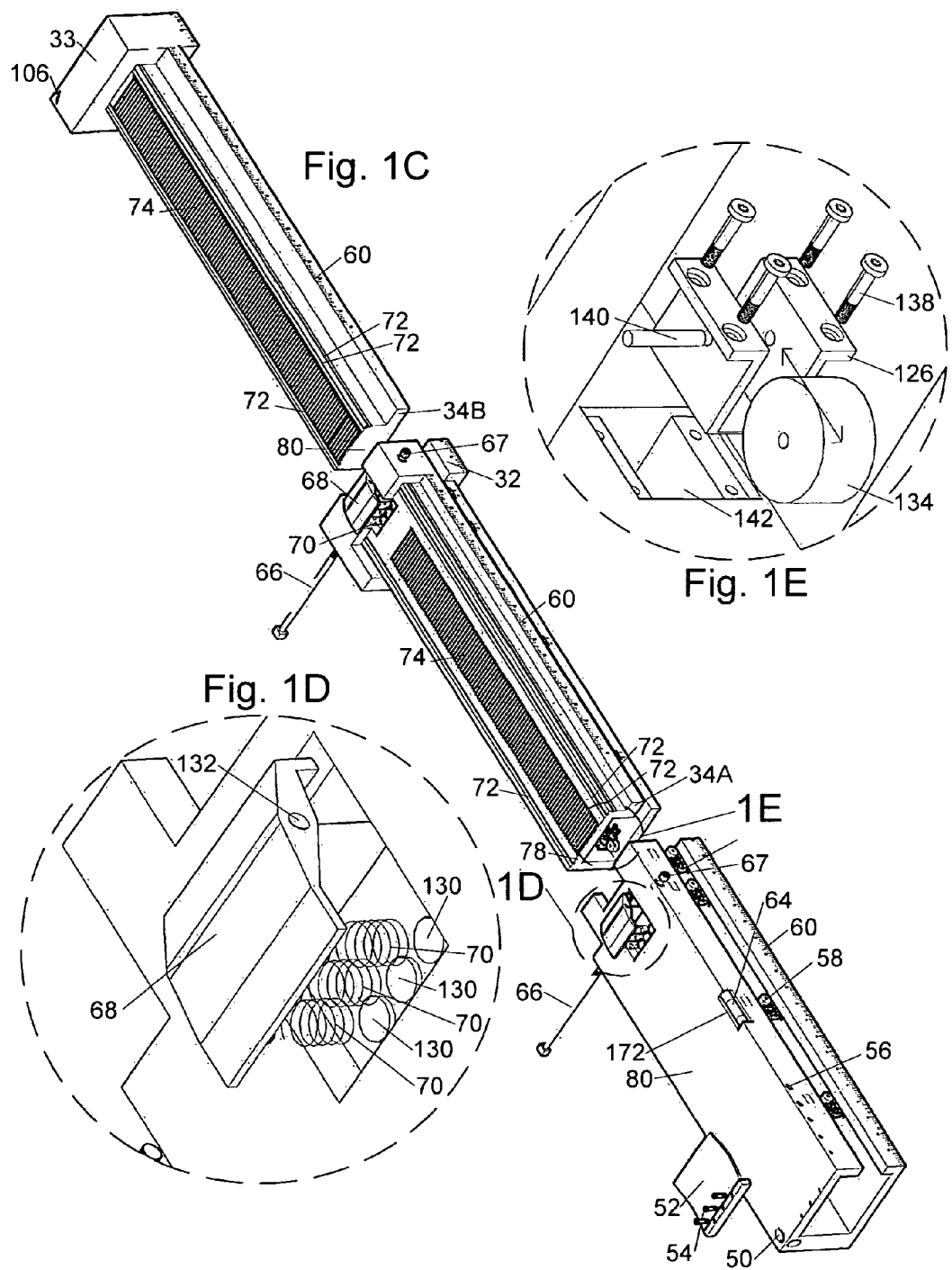

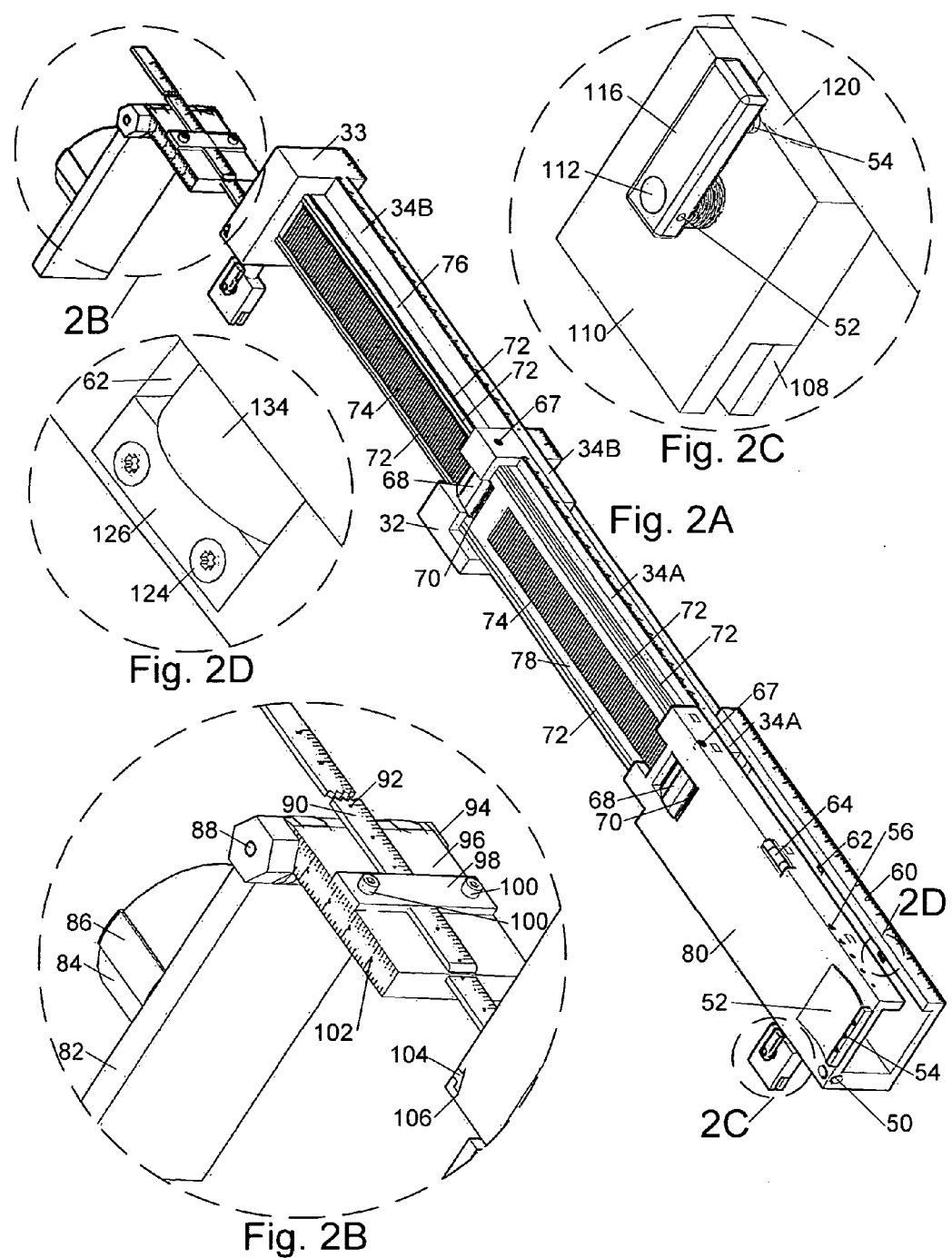

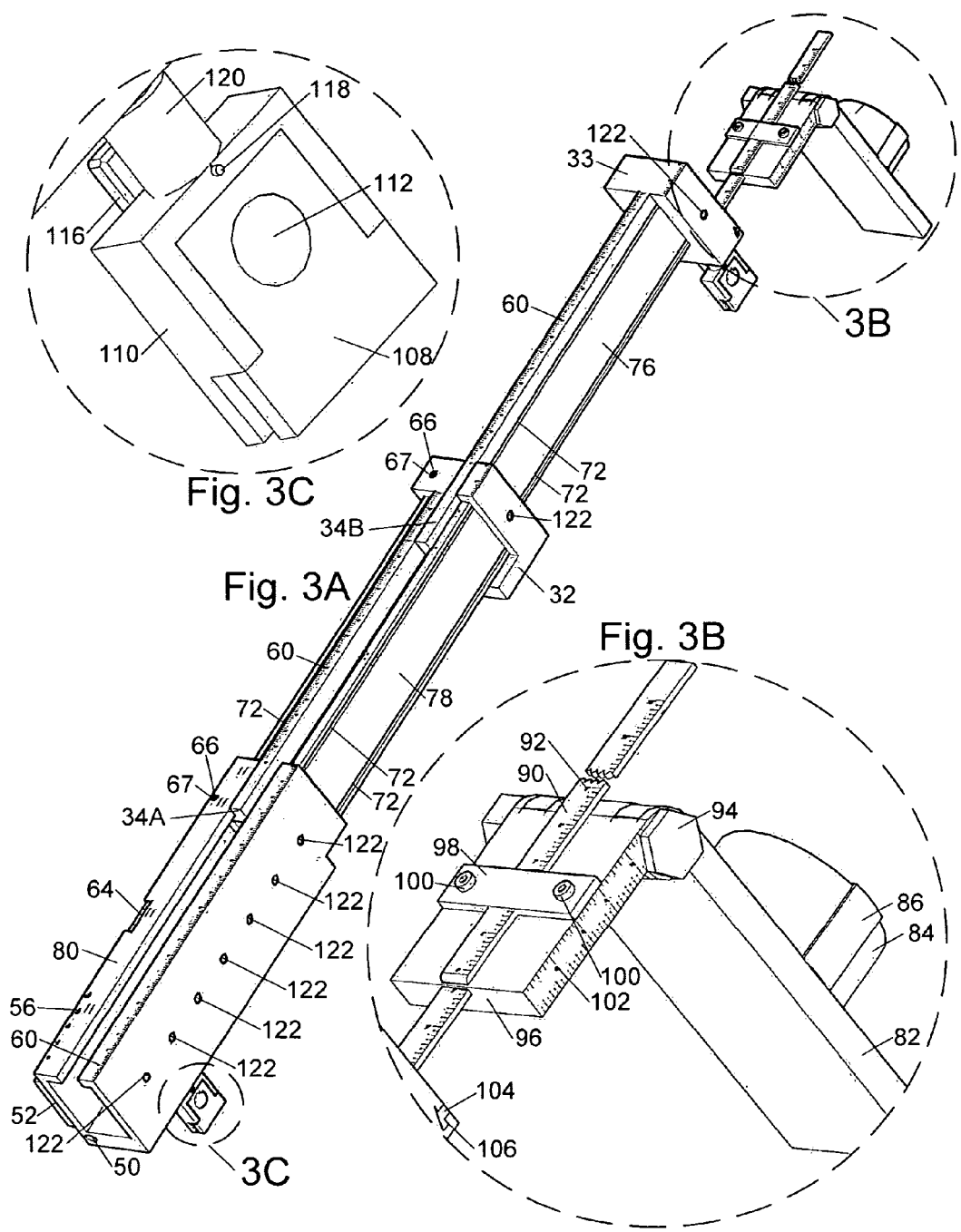

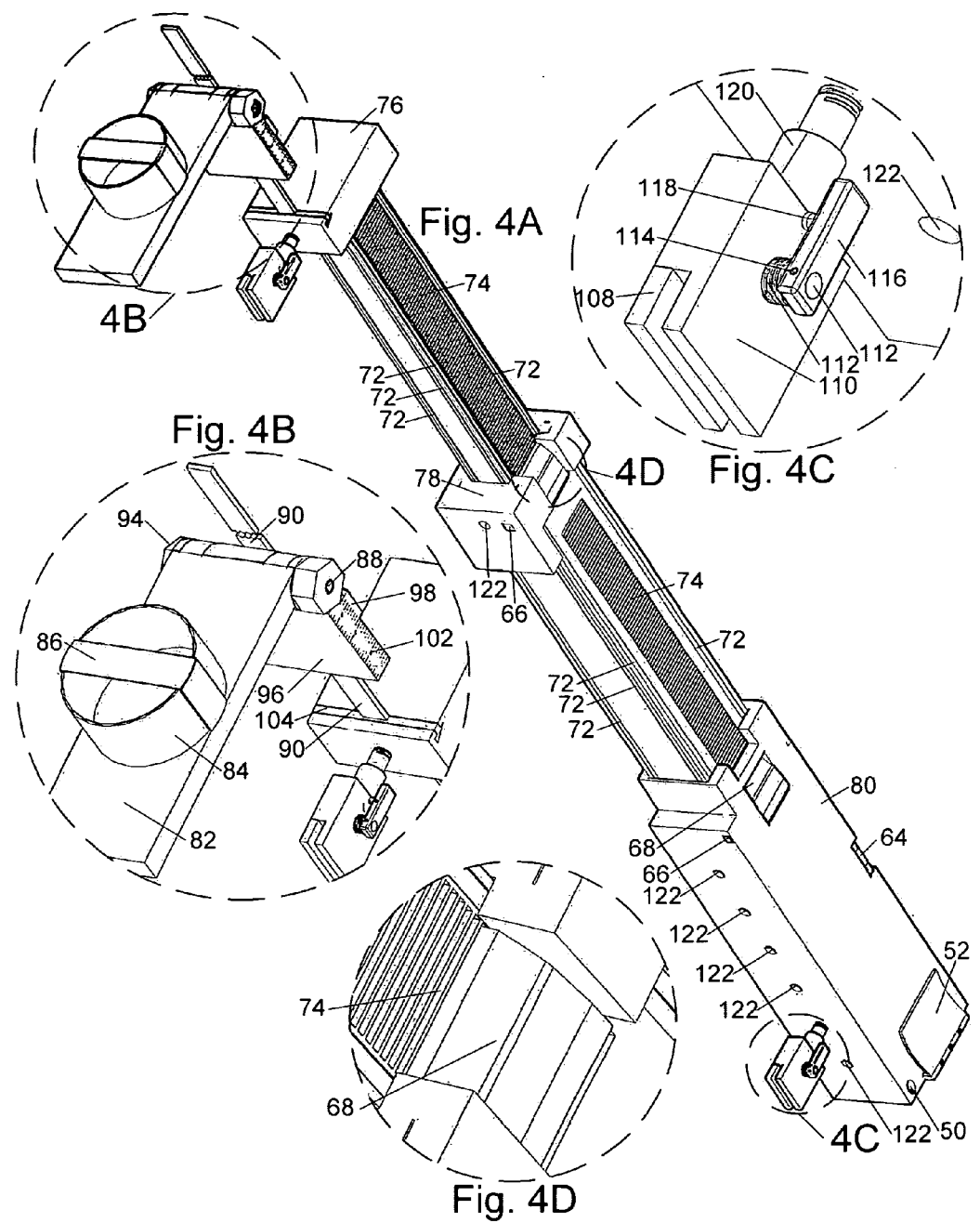

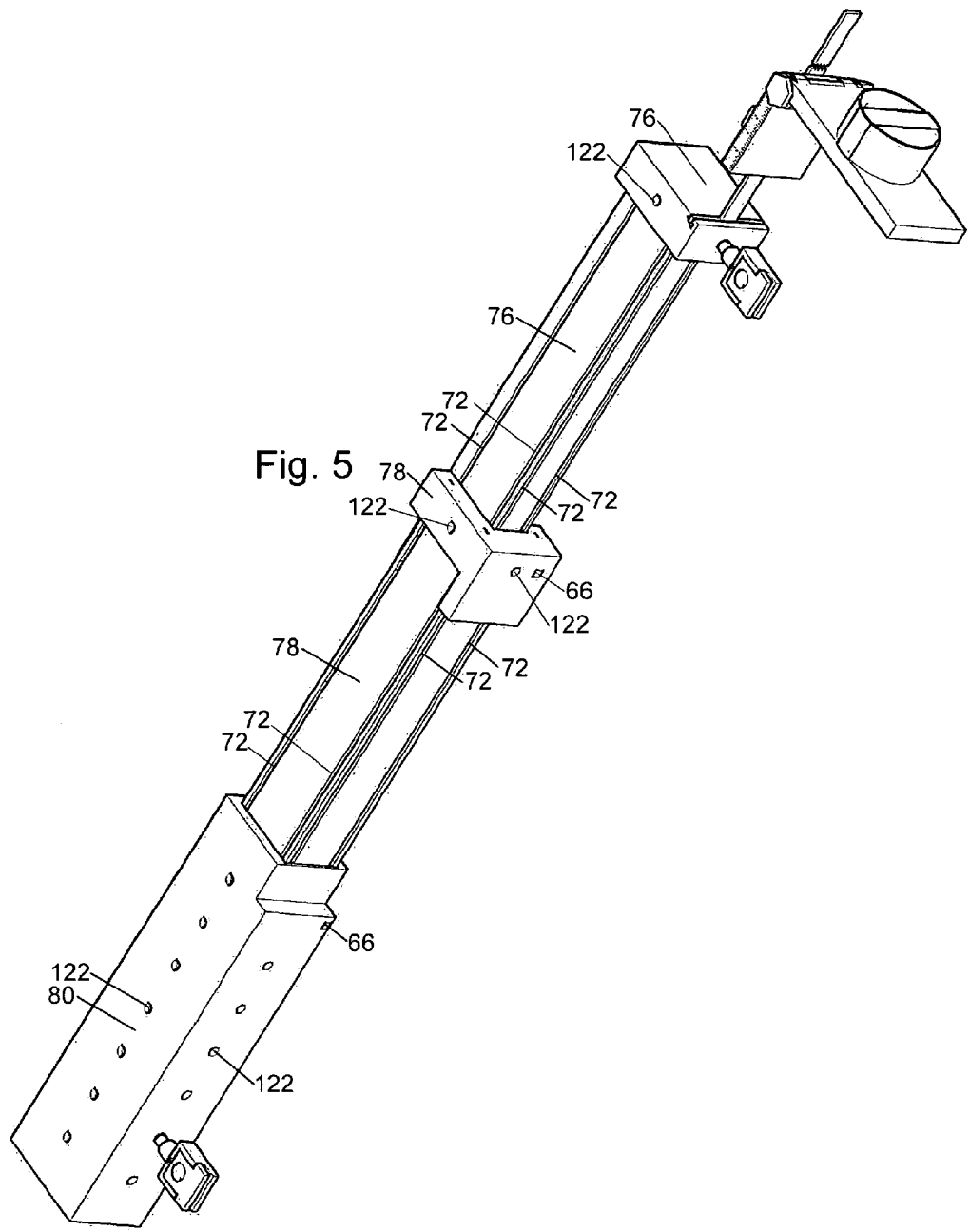

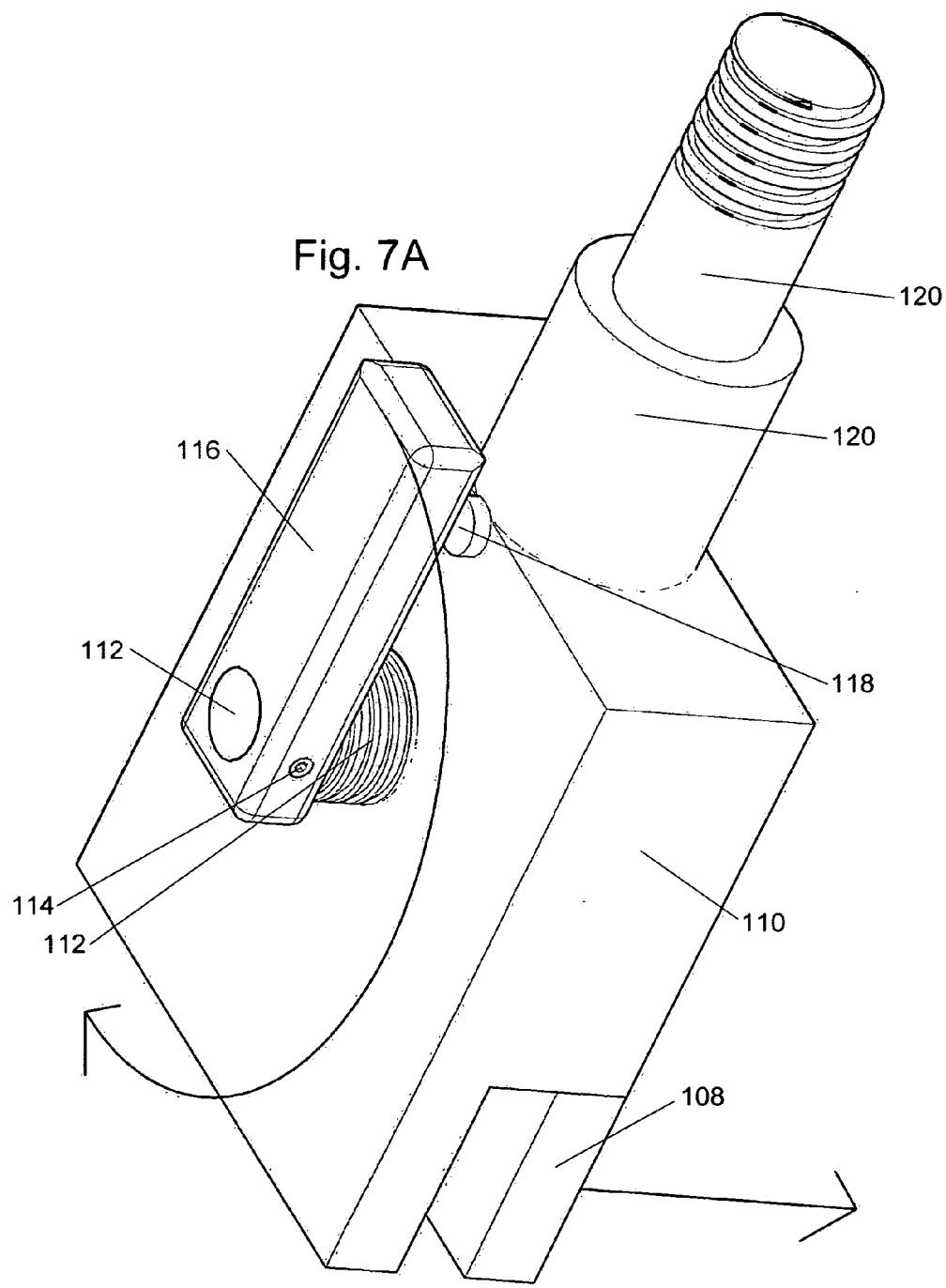

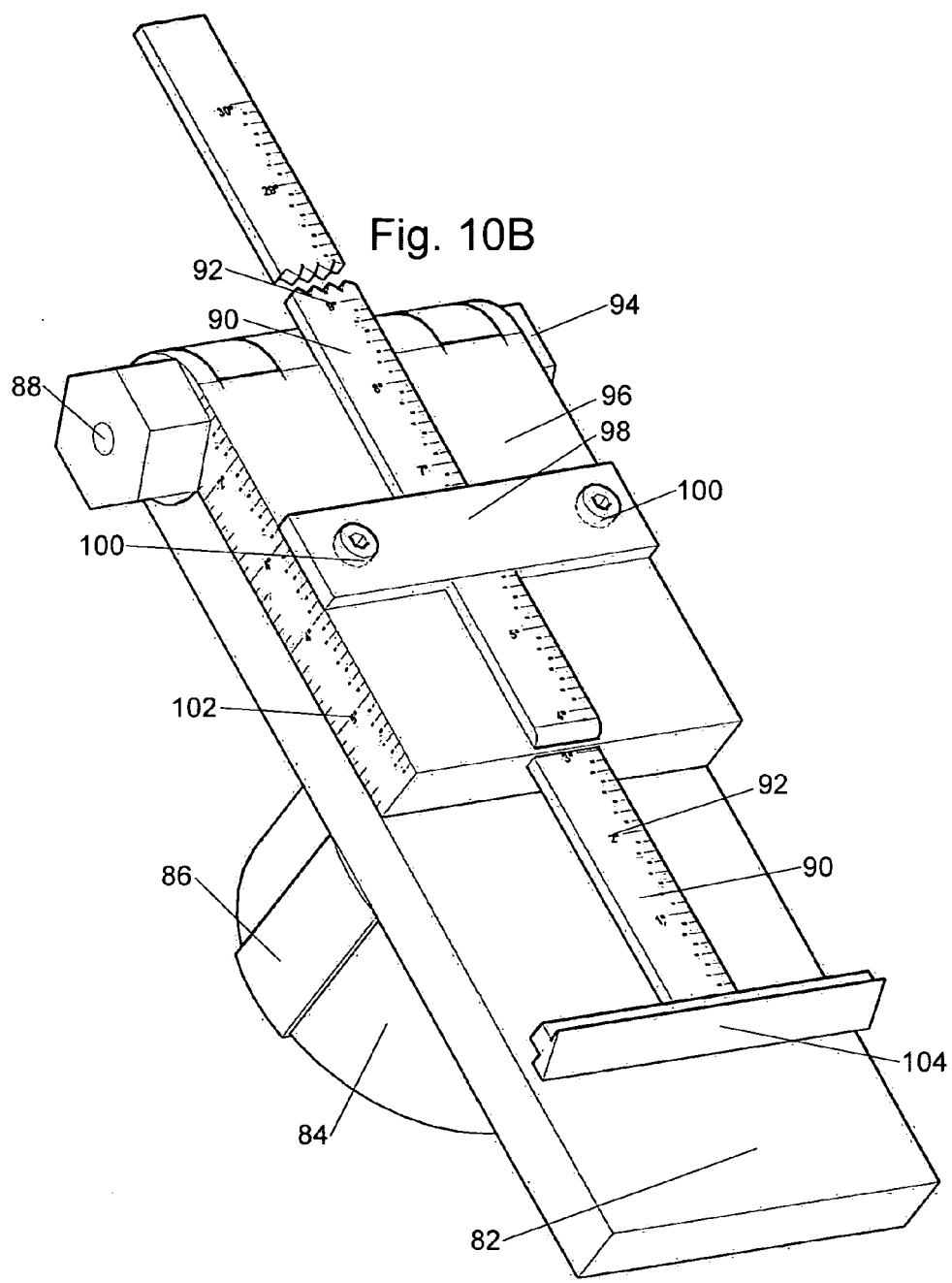

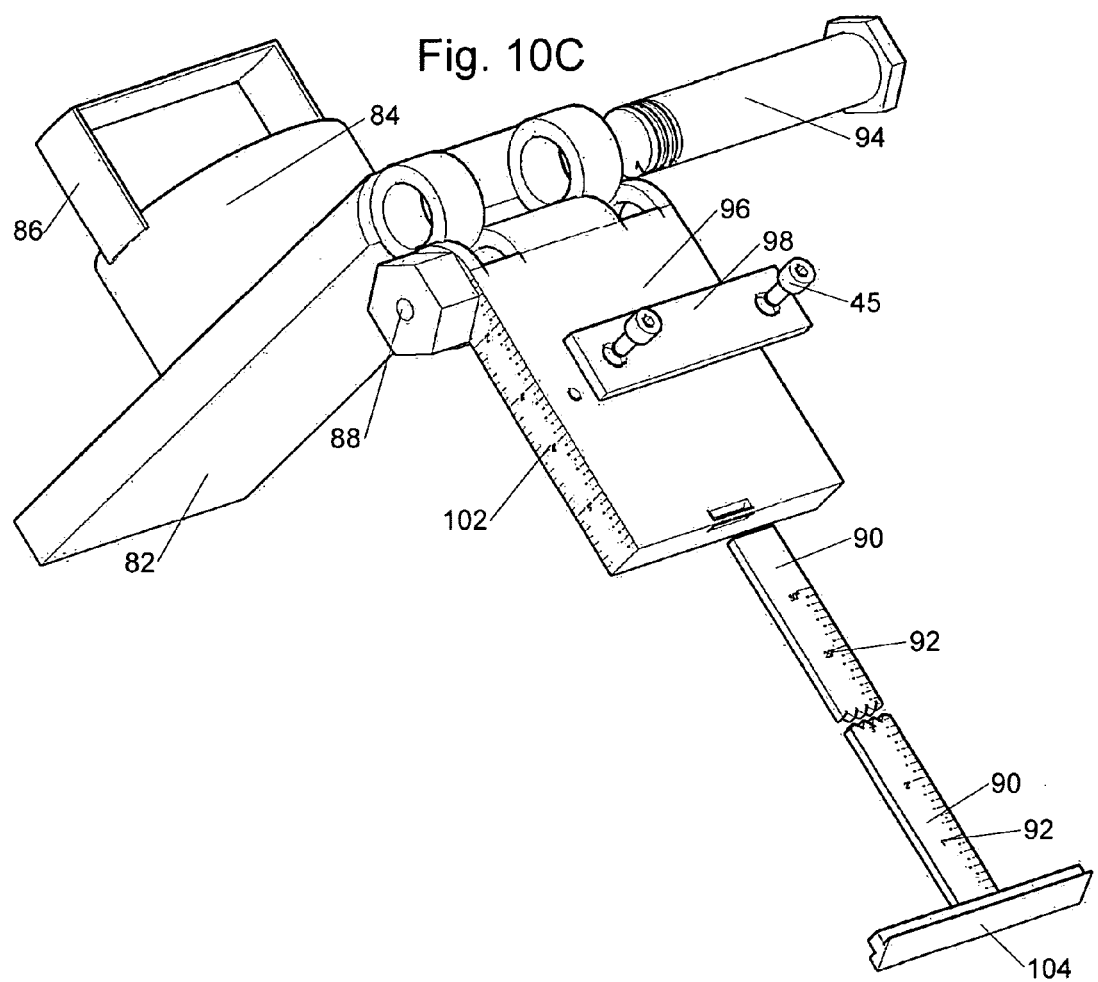

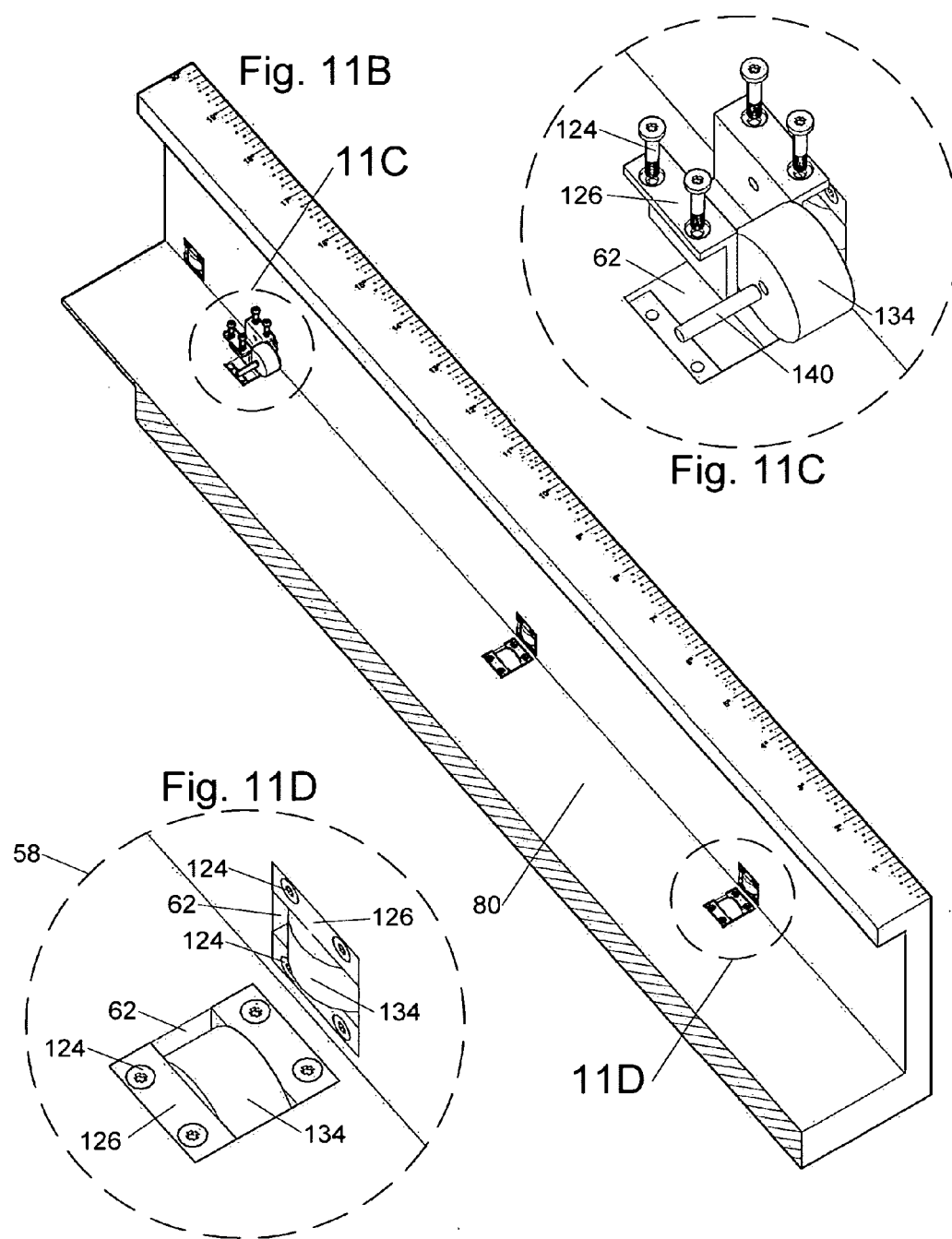

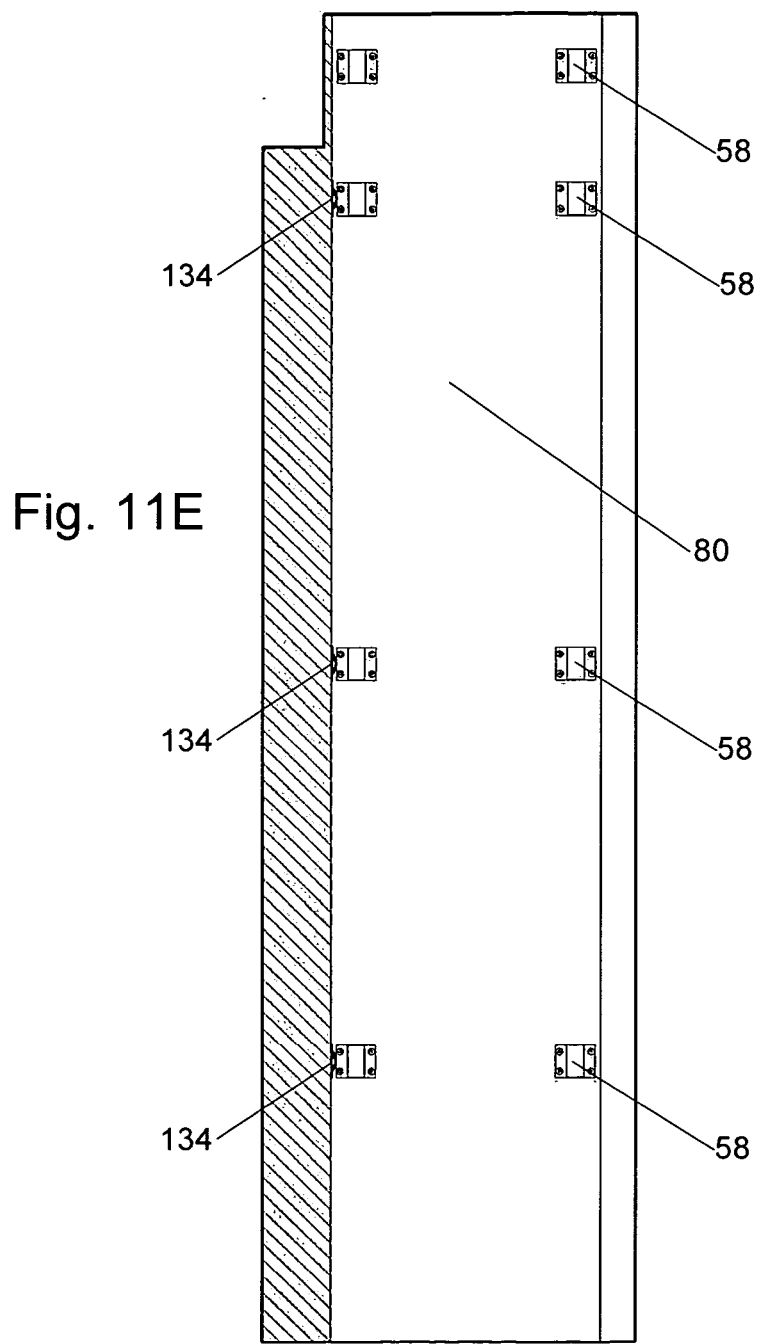

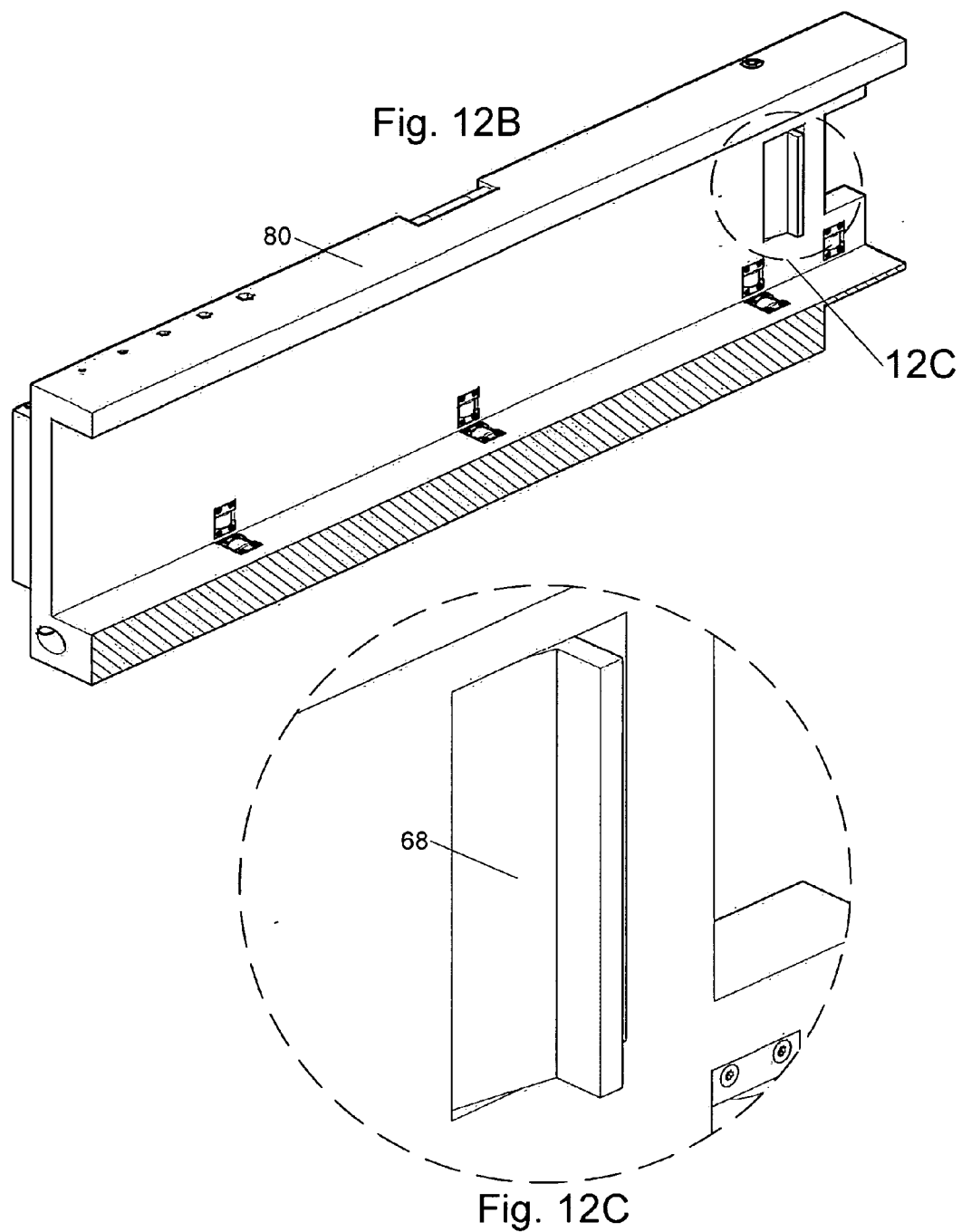

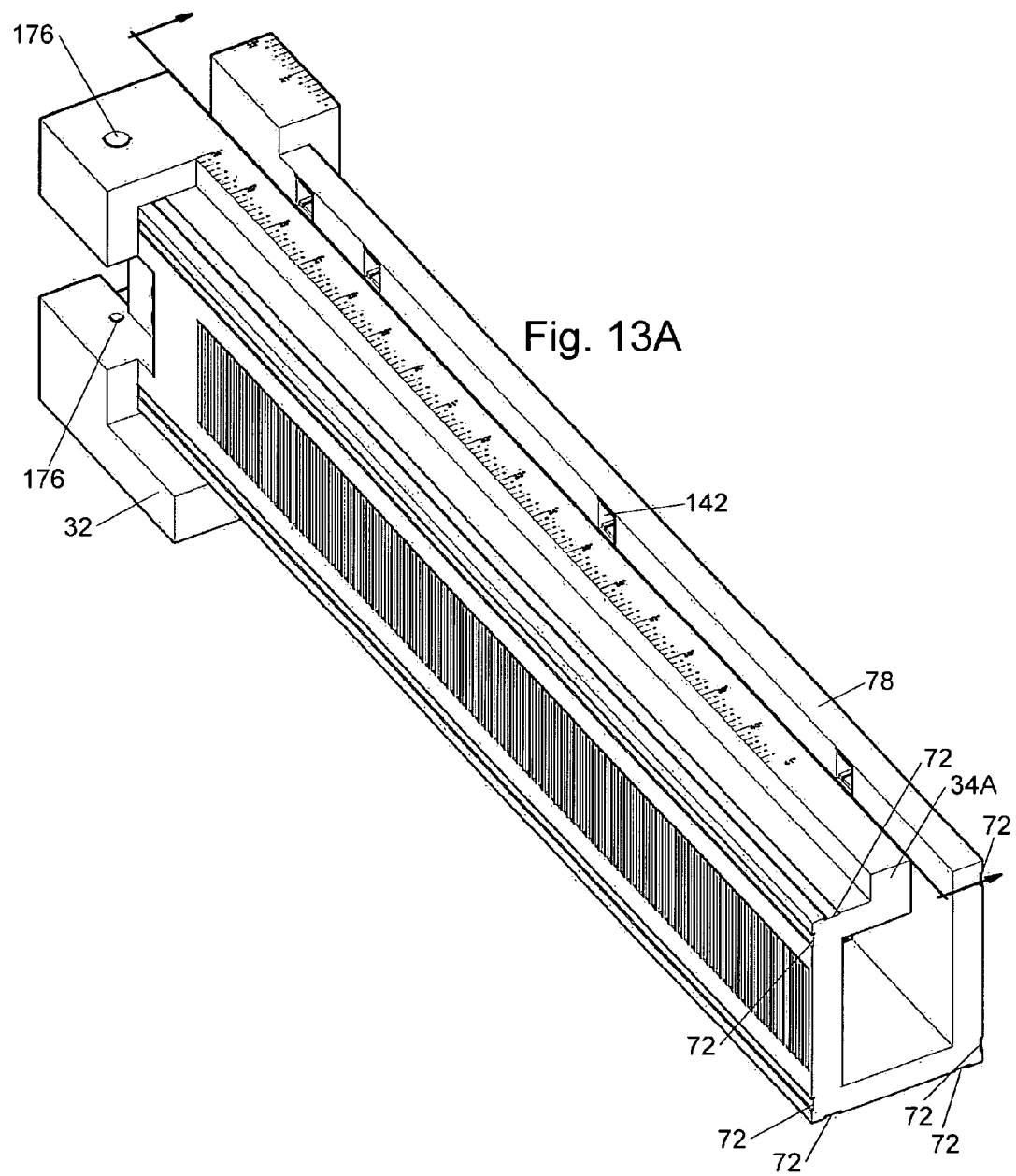

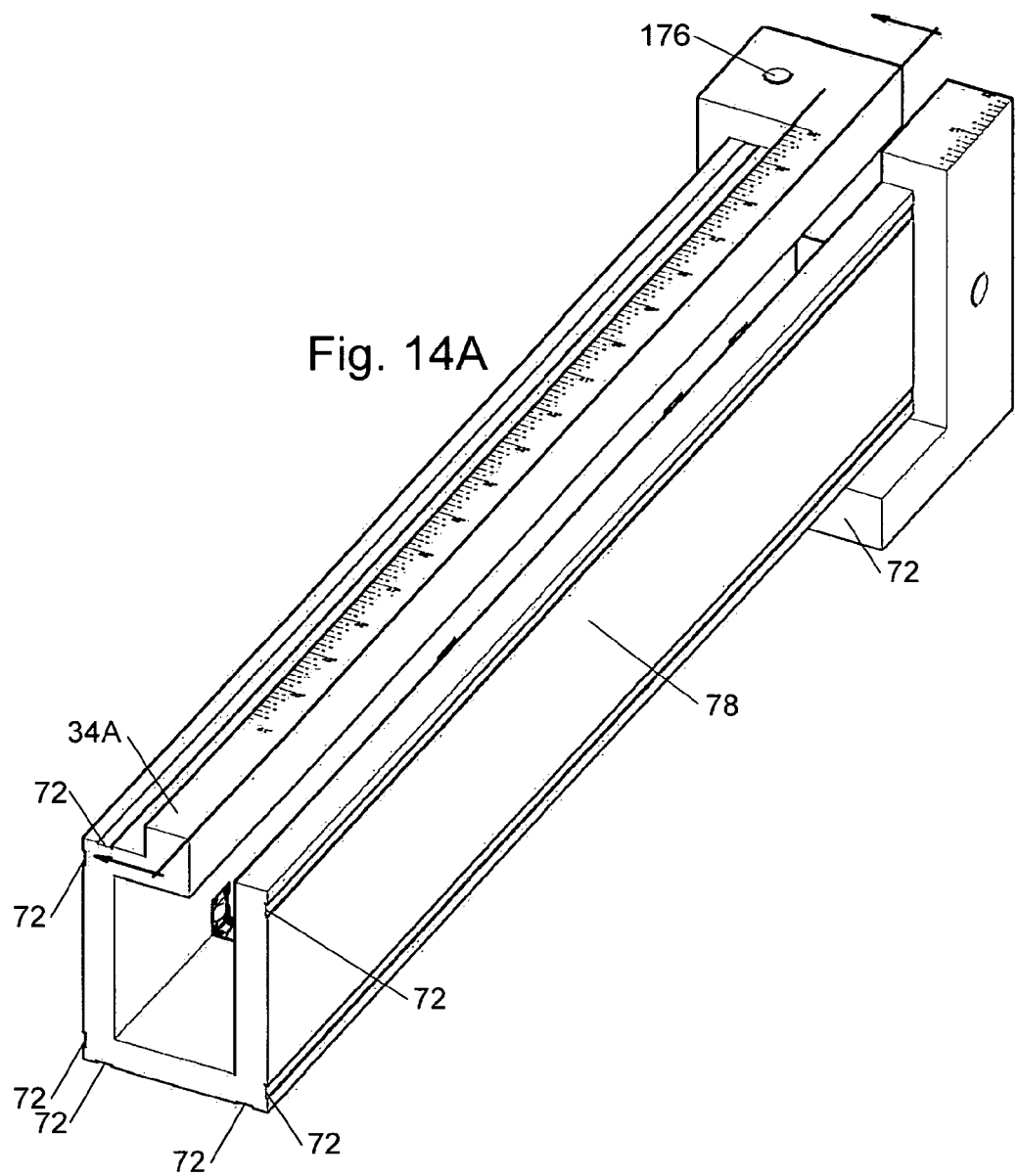

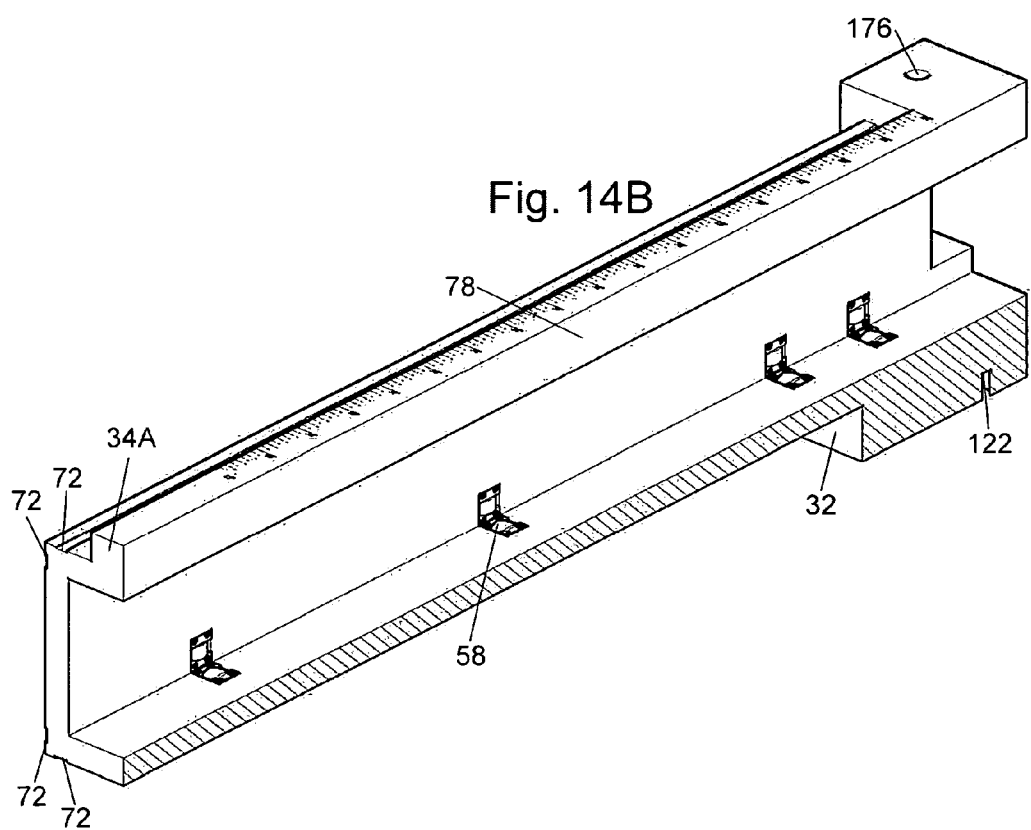

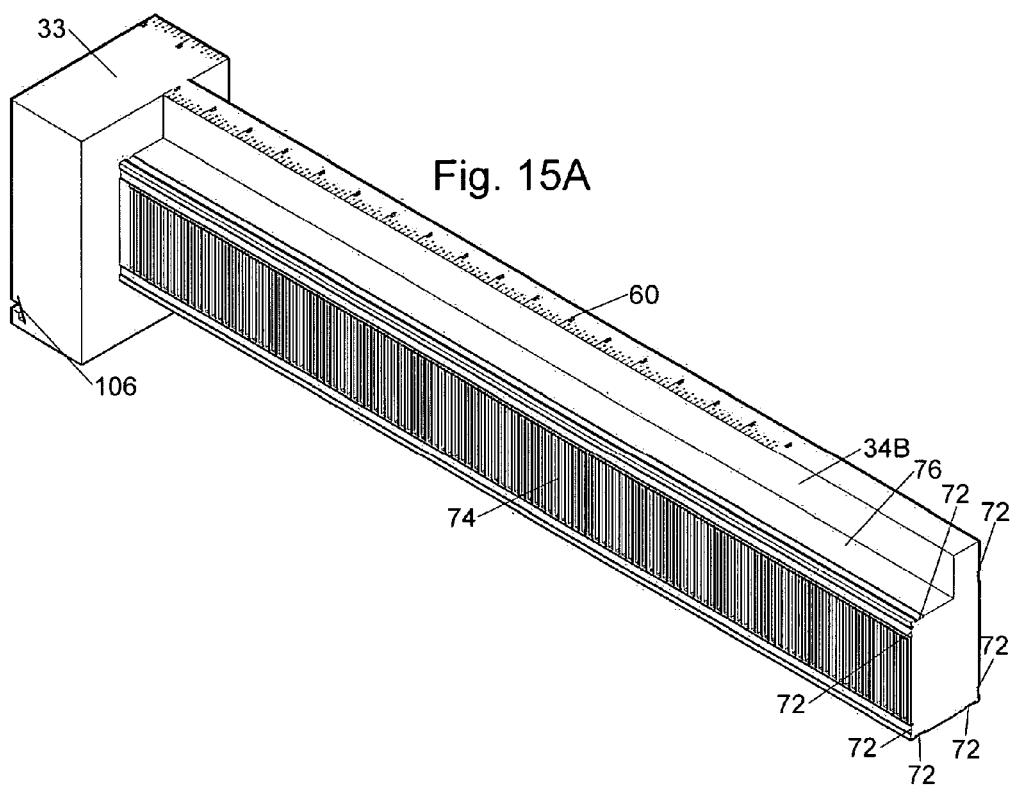

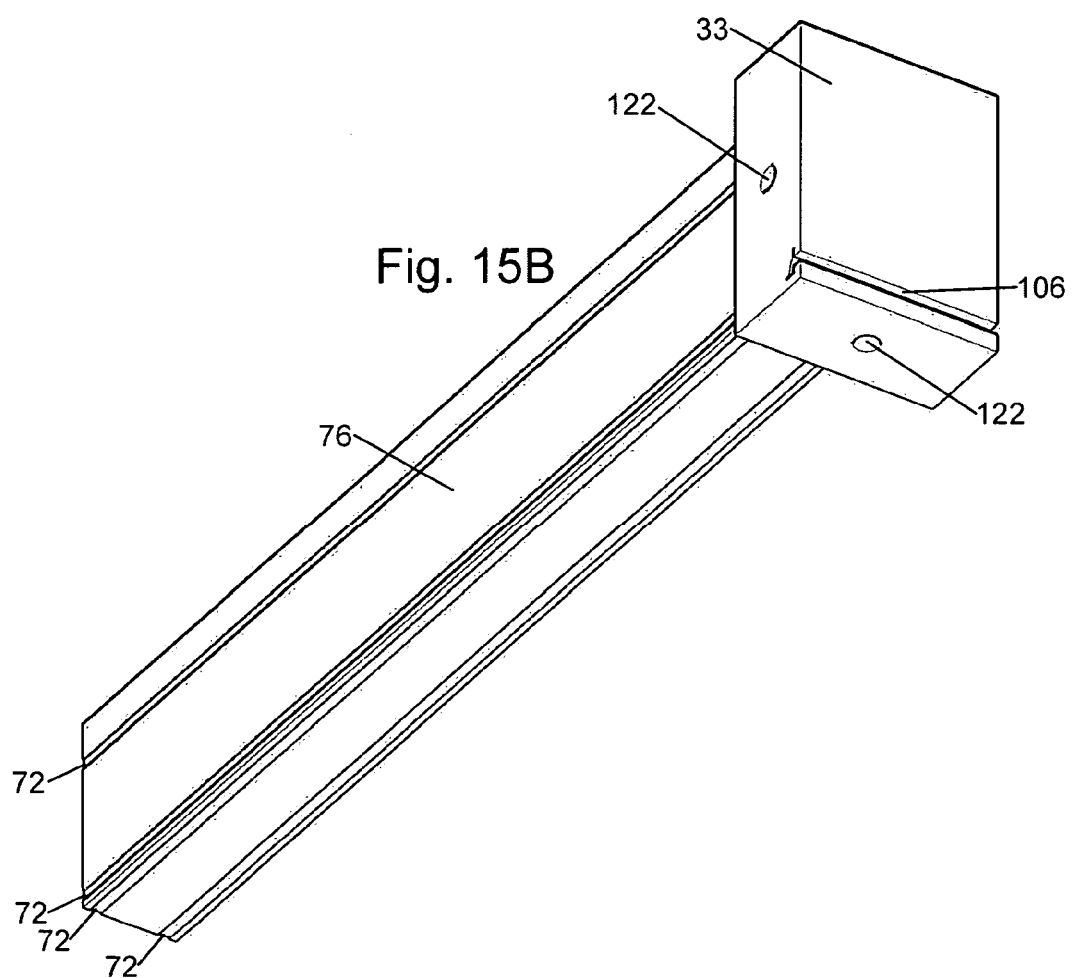

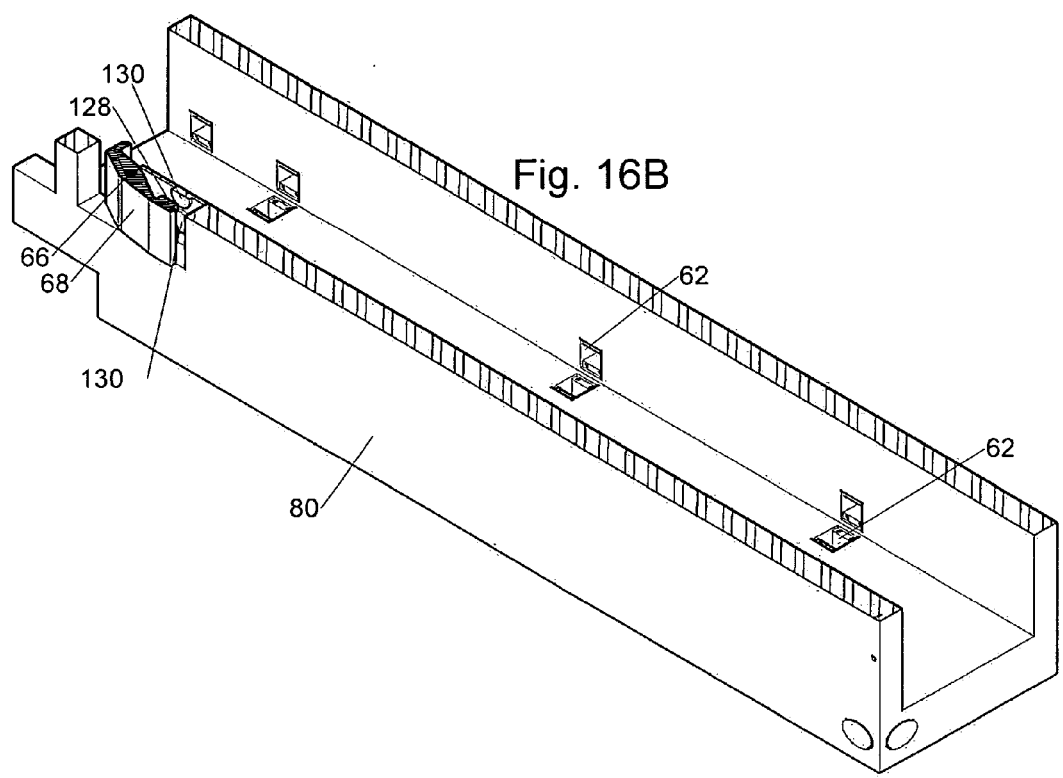

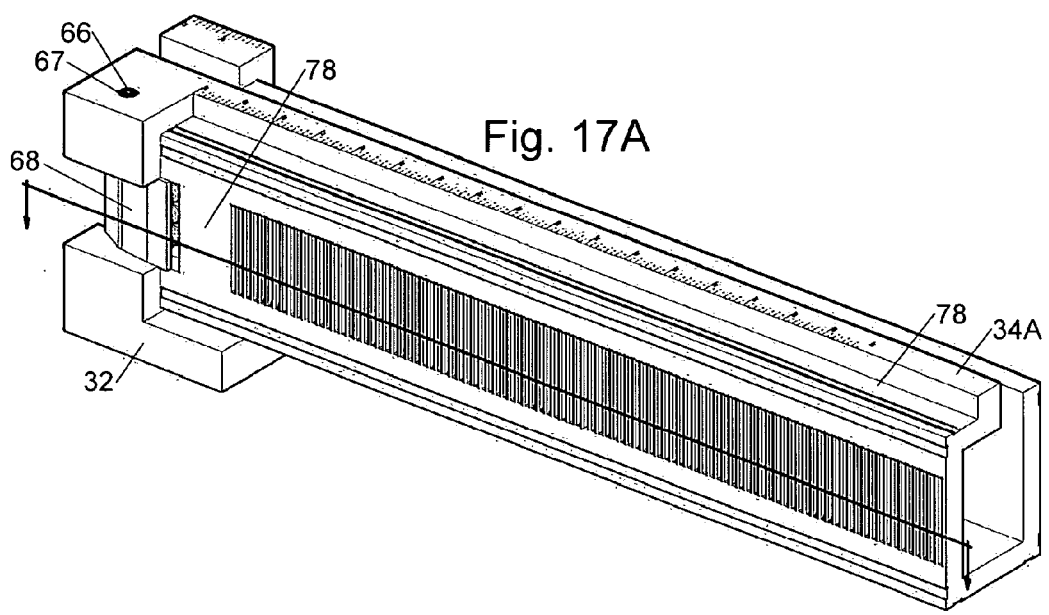

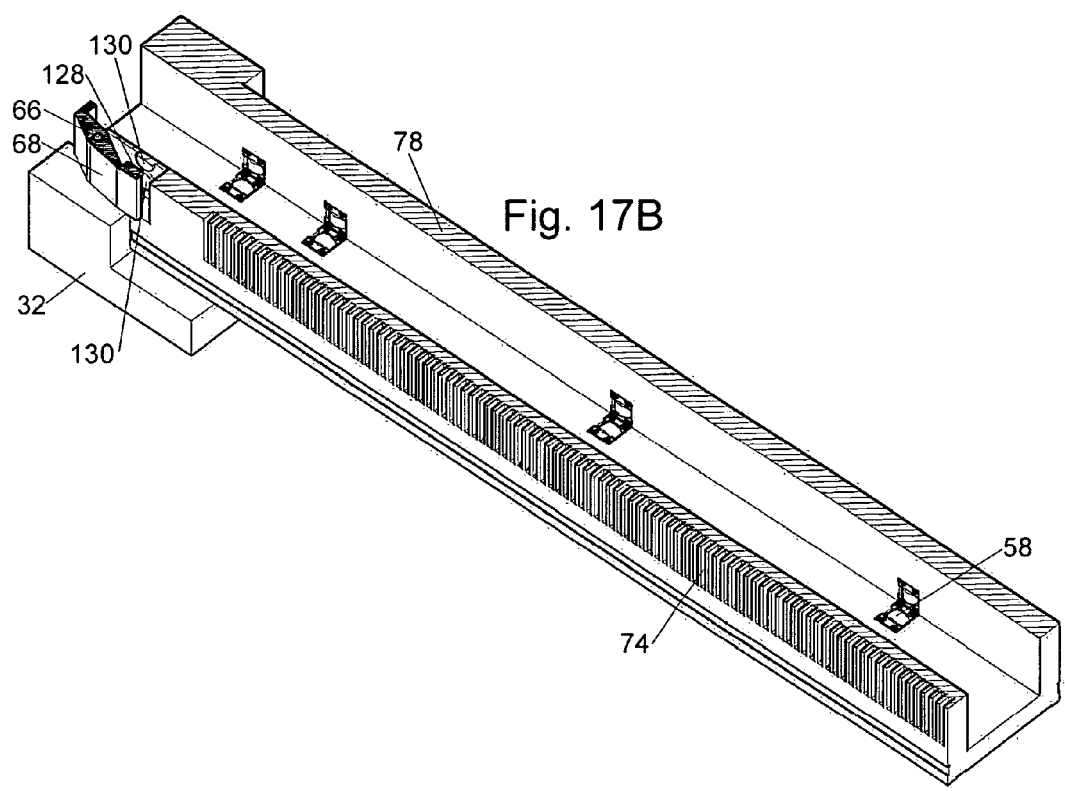

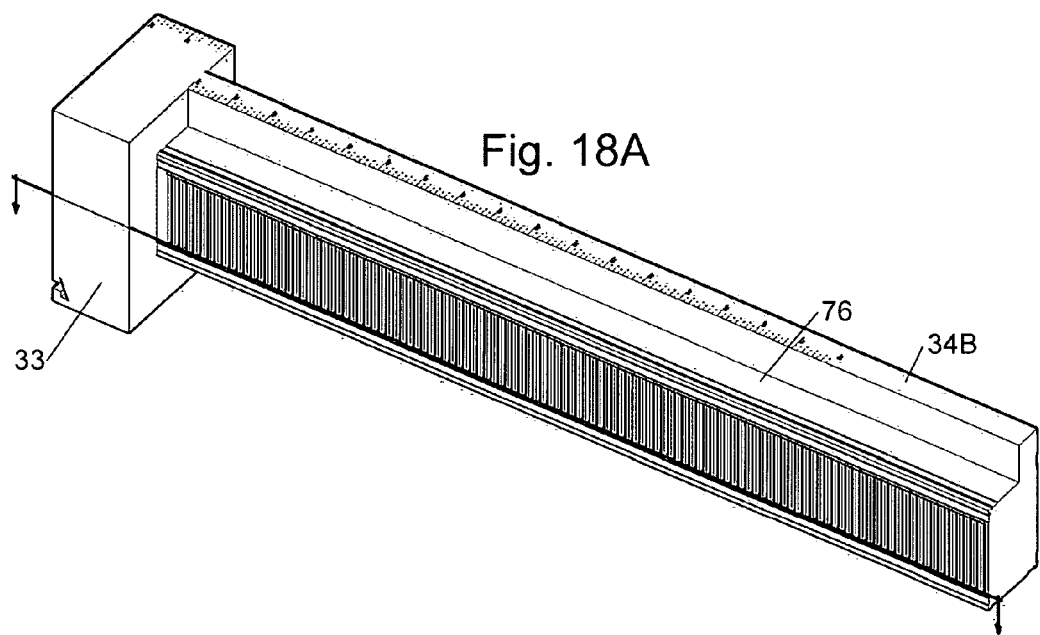

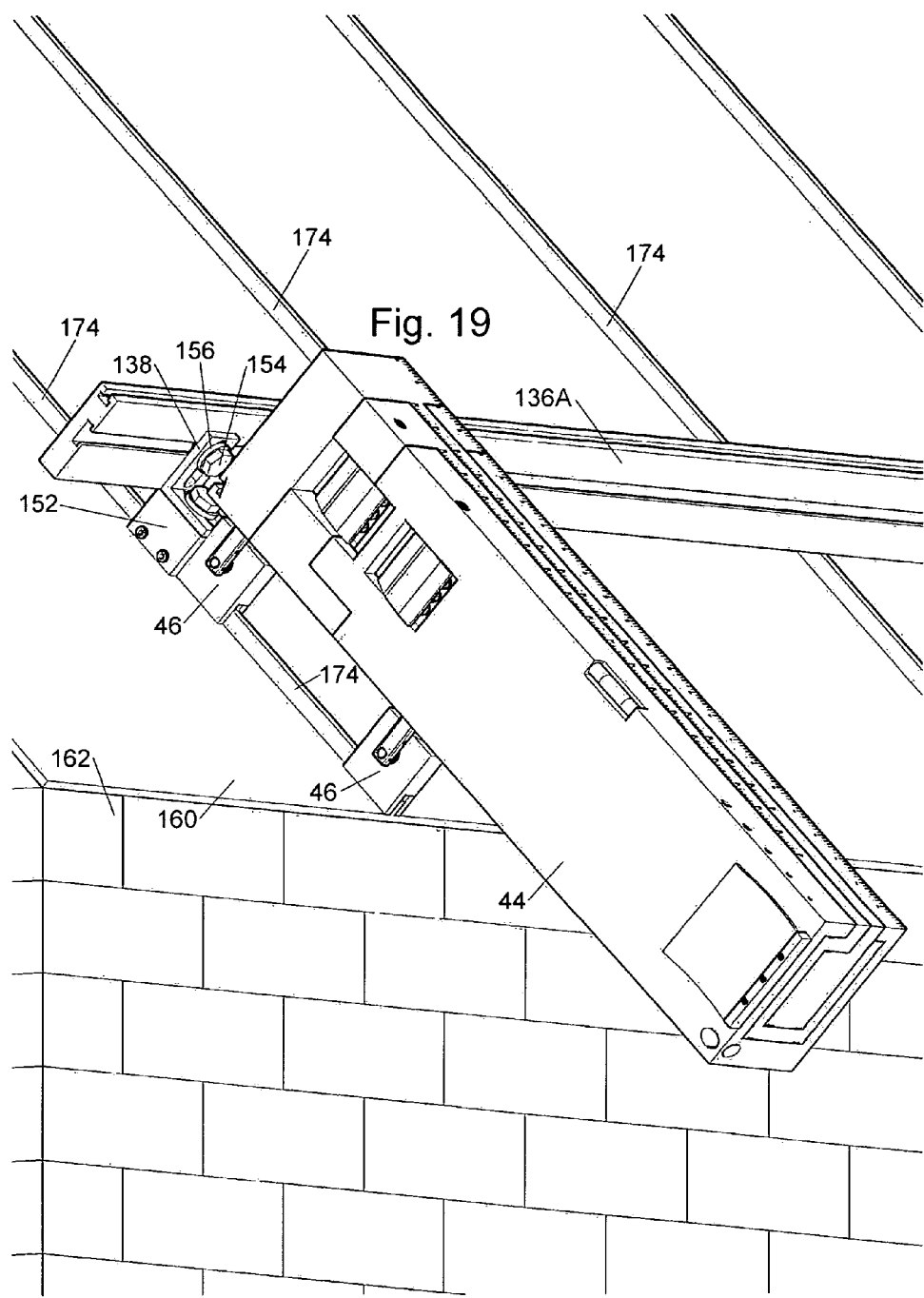

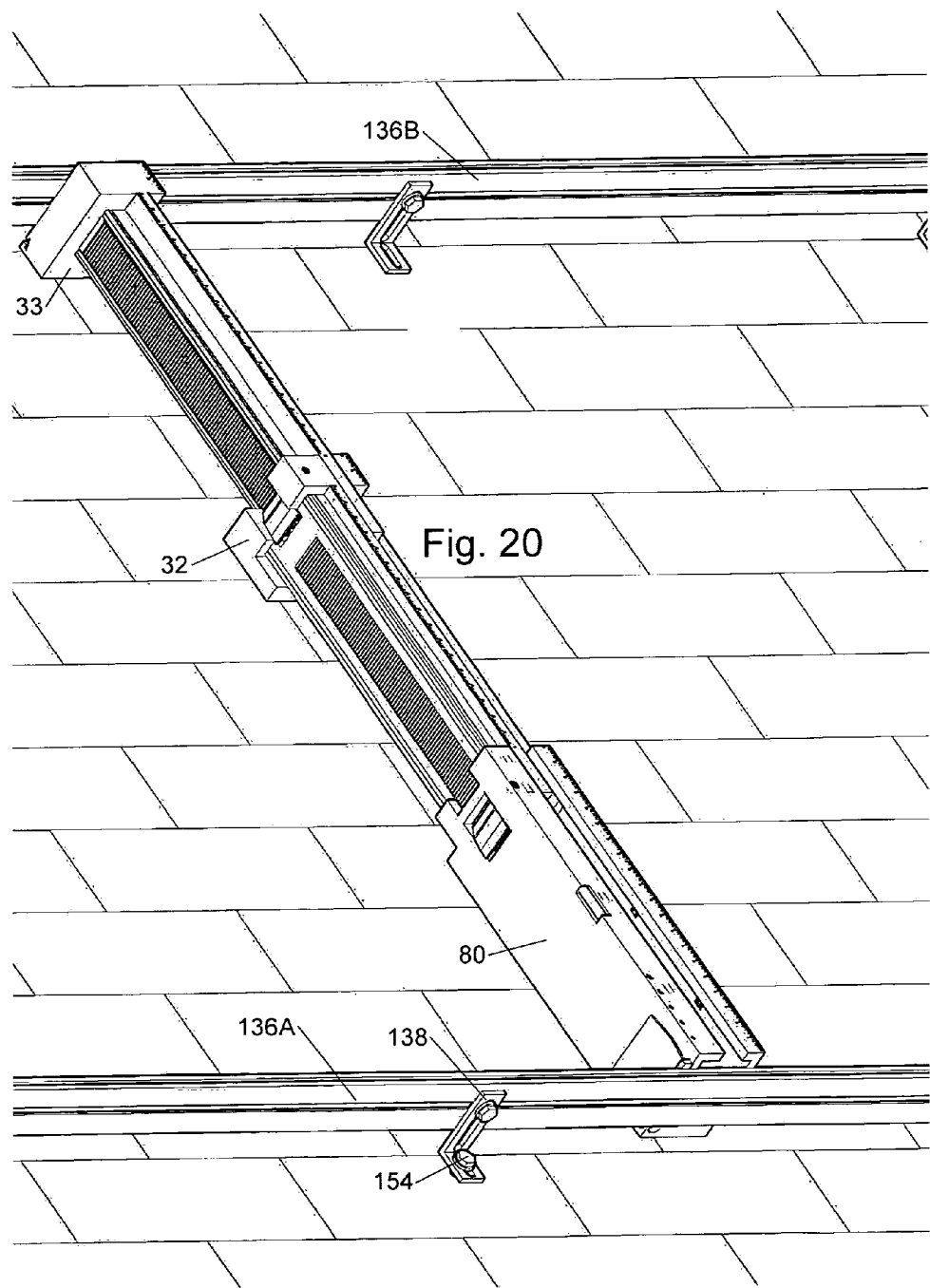

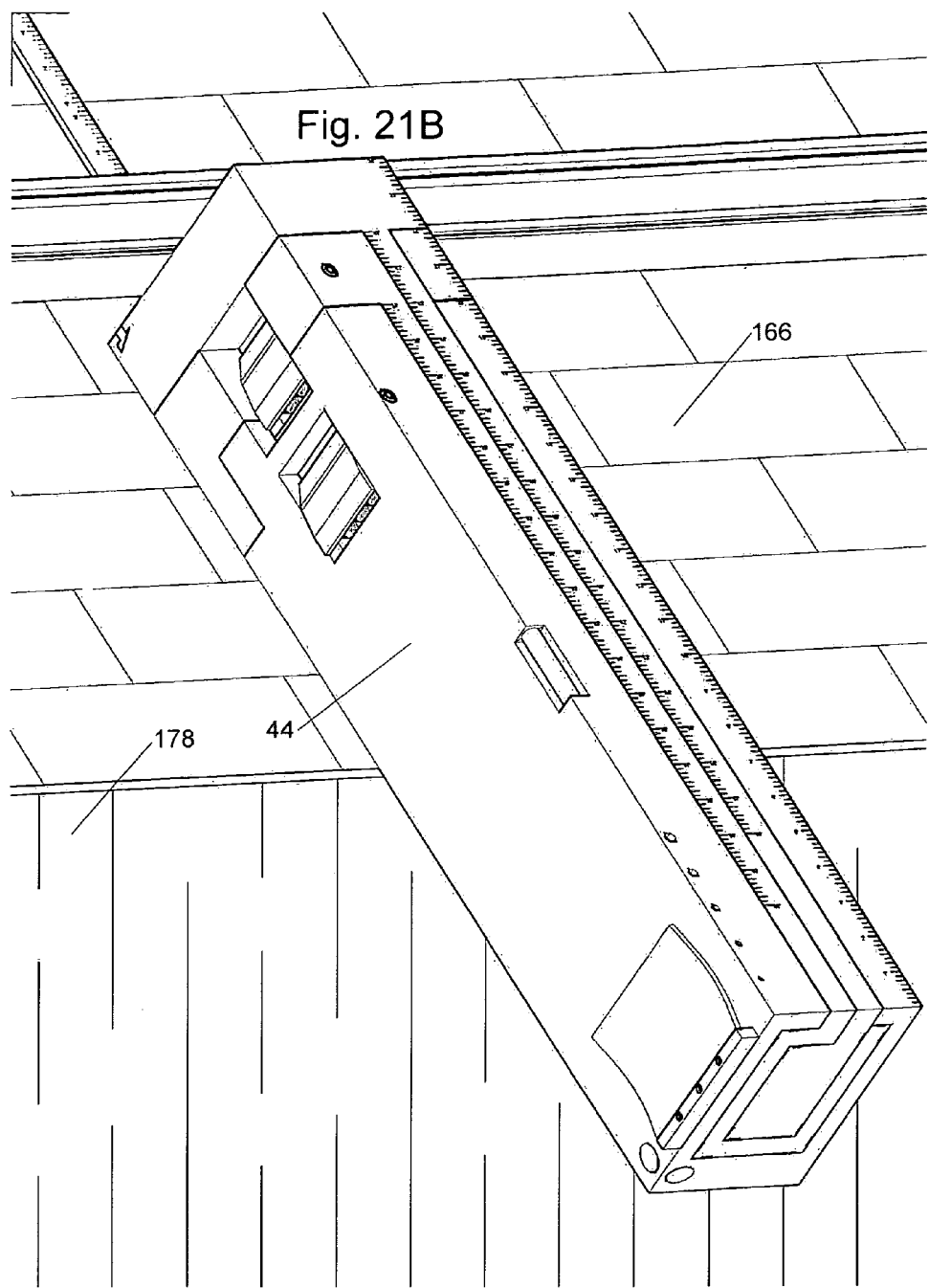

RETRACTABLE SOLAR RAILING INSTALLER AND GUIDE

TECHNICAL FIELD

The present invention is directed to an installation method and a device used for securing solar module railing, clamps, and equipment onto a roof in a safer, more expedient, and efficient manner than has previously been possible.

BACKGROUND

In recent years the field of solar energy has seen growth and improvements. Solar power is gaining ground as the future of energy. Solar power systems can be complimentary or may substitute typical power sources. Solar power systems can be installed in huge seas as well as for individual residential and commercial usage. For individual systems, it is not uncommon to locate these systems on the roofs of buildings or on some other surface.

In order to keep pace with the increased need for solar energy systems on residential and business locations it is important that the tools and methods used be safe and efficient. The tools and methods used in the industry should reflect and allow an increased efficiency through user convenience in installing the structures along with increased safety for the installer on the roof. This is critical because the efficiency of every install can increase the installers risk if the methods used require cumbersome tools and the tools themselves create a roof filled with clutter. Installation of solar structures is inherently dangerous because of the roofs height, angle, clutter, and the need for multiple tools. This is important because installing solar modules requires installation of articles like L-brackets, S-5 clamps, accurate measurements with plywood 2×4's, and support systems secured to roofs.

The first step in any solar Installation is of course properly sizing, designing, and selling the system to the client. Once this is done the installer must decide how to orient the modules for general appearance and proper fit. To do this the installer simply takes the roof working space dimensions; let's say 30'×15', and determines the number of rows and columns he/she needs. Now that the installer knows the number of rows needed, they must then figure out the length of each row. This is done by multiplying the width of the modules by the number of modules that will be on that particular row and adding 0.5" per module for the spacers that lie in between them.

The installer has now figured out that he/she has two rows of modules. For illustrative purposes, let's say that they are 20 feet long. Each row of modules must have two rails to be properly secured to the roof. Now that he/she knows how many rows they need and how long the railing will be, the installer will start attaching the S-5 clamps along the bottom seam of the roof so that the rail on the first row will attach to them. This is very difficult because the S-5 clamps will slide right off when you're trying to measure the distance and mark the proper installation location. It has been desired for some time to make a solar equipment holder that can securely eliminate the danger of reaching for falling S-5 clamps. Next, a set of S-5 clamps must be attached for row 1 to be installed. This is challenging because measuring, marking, and holding the S-5 on a proper installation location is very difficult on the roof because of their size and sliding.

Once all the S-5 clamps are up and properly aligned, we must now install the four rails that will hold the two rows of solar modules. The railing is very tricky because it does not attach directly to the S-5 clamp but attaches to an L-bracket that attaches to the S-5 clamp. Typically, we will attach the L-brackets to the railing and then place the rail more or less in the proper location.

Next, each installer will cut two by fours to the distance needed between the rails and use them as pre cut guides. Ultimately leaving several 2×4's of different sizes thrown along the roof. This practice takes time and it turns the roof into a cluttered nightmare.

Now, let's say the first rail is 15" from the bottom of the roof, we will take our 15" pre-cut two by four and use it as a template. This template is held by multiple installers and measuring to along the 20' length of the rail. Once it is in position and straight as possible, we bolt the L-bracket to the S-5 clamps and fully tighten the L-brackets to the rail. It is desired that a reliable method of measuring be used to avoid potential and costly mistakes that increase install time. Moreover, assuring that once the solar equipment is secured on the rails the possibility of crooked and waved rails are eliminated. After this is done, we will hopefully have a straight bottom rail to work off of for the rest of the install. A desire that has existed for some time is to accurately measure the distances without the need for bulky plywood that is without measuring indicia. One major problem with the present technique is that if the bottom rail is crooked, or if one of your 2×4's is cut even slightly off, as you begin measuring from the bottom railing up, that incorrect distancing will create waves in the railing making it impossible to install the modules on top of it without re-adjusting the rails.

What is needed is a device with a method that correctly combines tools for an installs. First, with respect to efficiency of installations, it is important to provide the installer with a combination tool where he does not worry about multiple devices for measuring, securing, and tightening critical components of the install. Second, it is important to provide a combination tool and method that will reduce calculation and measurement errors that result in creating crooked rails and waves in the railing. These are time consuming errors that require the installer to re-adjust the rails before installation of solar modules. No one wants a solar module that is forced into the rail or a rail so crooked that the module will not fit. Third, it is important to allow installers a safe installation environment by reducing the clutter created from using multiple tools. For instance, an installer using the 2×4 measuring pieces, having to hold the L-brackets, and S-5 Clamp all while simultaneously assuring the proper distance between the rails. All this followed by securing the L-brackets to the S-5 Clamps on a high roof top area. For the forgoing reasons, there is a need for a method and tool that can be used in roof top installations that increases efficiency, increases safety for installers, reduces errors, and reduces the cost of installations.

SUMMARY

The present invention is directed to a device that satisfies the need to reduce clutter, reduce install times, increase measurement dependability, and increase safety by combining multiple tools into one self-adhering multipurpose tool that can measure with precision and secure solar equipment during a solar install.

According to one aspect, the present invention generally comprises a device for measuring from the bottom of a roof to the first rail. The device comprises a housing with a retractable measuring tool that slidingly engages from a central housing that attaches itself to a roof and secures solar tools in position. This measuring tool is composed of sections with ruled measurements. This measuring device may include a fastener system for releasing and locking each respective housing section into a secure position for consistent measurements. Each respective housing section slides in and out of the central housing via a groove and roller systems. This system is designed to allow for faster and smoother extension and folding. One benefit of this is that the speed of taking measurements would be increased while simultaneously providing durable support for holding equipment in place. The respective housing section is locked into place via a fastener that may be located on the second housing base and first housing. Above each respective housing is a measuring tool that displays the unit measurements when marking distances for a proper installation. This fastener will allow the measuring device to remain in an open position for precise measurements. Furthermore, when the tool is moved over for the next railing placement or securely holding a seam clamp, the installer is assured that the tool will be in exact position.

Unlike other retractable measuring devices on the market I have invented a new retractable measuring device that may extend and measures with precision through a roller groove fastener system that safely secures equipment for solar roof installations and eliminates the need for 2×4 measurements.

According to one aspect, the present invention provides a method for securing L-brackets and S-5 clamps when mounting rails onto a roof. Further comprising attaching a retractable measuring device wherein said retractable measuring device may be attached directly to the seam of a roof. This retractable measuring device measures distances between a roofs edge and a roofs rails. In addition, the retractable measuring device holds L-brackets in their respective locations. Moreover, the retractable measuring device comprises a seam clamp holder that securely attaches the seam clamp along the seam. Furthermore, the retractable measuring device has a holder that may be used for tightening seam clamps onto rails. This retractable measuring device also has an extension attachment with measuring indicia. The tool will both measure distances efficiently and hold solar equipment to the roof.

It is another object of the present invention to provide a new retractable measuring device which can withstand the weight and pressure of heavy equipment.

It is another object of the present invention to provide a new retractable measuring device which can hold S-5 clamps and L-brackets on solar roof installations without the threat of equipment sliding off.

It is another object of the present invention to provide a new retractable measuring device that not only measures like non-analogous art but can secure itself to a roof and hold equipment securely.

It is another object of the present invention to provide a new retractable measuring device which is designed with safety in mind because it eliminates the need for bulky tools and primitive 2×4's that create a dangerous solar install environment.

It is another object of the present invention to provide a new retractable measuring device which attaches to a seam roof, measure from the first rail to the second rail, and keep doing this until all the rail is installed. It will be used as a template to allow for straight, wave free railing, to easily attach the modules to the slap.

It is another object of the present invention to provide a new retractable measuring device that is a straightedge, telescoping level, and ruler; because it does these things as it pertains directly to solar installation, module installation, and railing installation.

BRIEF DESCRIPTION OF DRAWINGS

These and other features, aspects, and advantages of the present invention will become better understood with regard to the following description, appended claims, and accompanying drawings where:

FIG. 1A shows a perspective view of an embodiment of a Retractable Solar Clamp and Railing Installer and Guide in closed position;

FIG. 1B shows an embodiment of the present invention with an enlarged view of ruling while in a closed position;

FIG. 1C shows an exploded perspective view of an embodiment of the invention while in an opened position;

FIG. 1D-1E shows an exploded side and top view, respectively, of a clip and roller system of the present invention;

FIG. 2A shows a perspective side view of an embodiment of the present invention while in an opened position with all parts;

FIG. 2B shows an enlarged perspective side view of an embodiment of the present invention of a roof attachment employed to position measurements for rail placement as in FIG. 2A, wherein the tool is in an open position;

FIG. 2C shows an enlarged perspective side view of an embodiment of an adjustable roof seam clamp attached to the bottom of an embodiment of the present invention;

FIG. 2D shows an enlarged side view of an embodiment of an interior roller unit recess with roller;

FIG. 3A shows an alternative perspective side view of an embodiment of the present invention in an opened position with all parts;

FIG. 3B shows an alternative enlarged top right away perspective side view of an embodiment of the present invention of a roof attachment employed to position measurements for rail placement;

FIG. 3C shows an alternative enlarged perspective side view of an embodiment of an adjustable roof seam clamp attached to the bottom of an embodiment of the present invention;

FIG. 4A shows a bottom left toward perspective view of an embodiment of the present invention with the tool opened with all parts;

FIG. 4B shows an alternative enlarged top view of an embodiment of the present invention of a roof attachment;

FIG. 4C shows a bottom left perspective side view of an embodiment of an adjustable roof seam clamp and connector;

FIG. 4D shows an enlarged top perspective view of an embodiment of the present invention of a clip component and locking grooves;

FIG. 5 shows a bottom right toward perspective view of an embodiment of the present invention with the tool opened with all parts;

FIG. 7A shows a top right perspective view of an embodiment of the adjustable roof seam clamp of 2B, with moveable tightening lever;

FIG. 10B shows a top right perspective view of an embodiment of the roof attachment assembly in closed position;

FIG. 10C shows a top right exploded view of an embodiment of the roof attachment;

FIG. 11B shows a side perspective partial sectional view of an embodiment of an first housing;

FIG. 11C shows a top exploded perspective view of an embodiment of a roller system and a roller housing assembly for sliding housing;

FIG. 11D shows an enlarged top perspective view of an embodiment of a roller assembly;

FIG. 11E shows a perspective side sectional view of an embodiment of a first housing;

FIG. 12B-12C shows a perspective right side sectional view and enlarged roller clip assembly tool, respectively, of an embodiment of the first housing;

FIG. 13A shows a right side perspective view of an embodiment of the invention of a second housing as shown in FIG. 1C;

FIG. 14A shows an alternative front right side perspective view of an embodiment of the invention with a second housing;

FIG. 14B shows an alternative right side perspective sectional view of an embodiment of the second housing;

FIG. 15A shows a top left perspective side view of an embodiment of an third housing as shown in FIG. 1C;

FIG. 15B shows a bottom right perspective view of an embodiment of the third housing as shown in FIG. 15A;

FIG. 16B shows a perspective sectional side view of an embodiment of the first housing sitting on its bottom and showing components;

FIG. 17A shows perspective side view of an embodiment of a second housing as shown in FIG. 1C;

FIG. 17B shows a perspective sectional top view of an embodiment of the second housing with a roller system and clip;

FIG. 18A shows a perspective side view of an embodiment of the third housing;

FIG. 19 illustrates a perspective side view of an embodiment of the invention attached to a roof seam as it holds a roof seam clamp, l-brackets, and rails;

FIG. 20 illustrates a perspective side view of a preferred embodiment of the invention, wherein the invention is positioned between two rails and installing railing.

FIG. 21B illustrates a perspective side view of an embodiment of the invention being held in place by a roof attachment as in FIG. 21A.

Figure 6A:
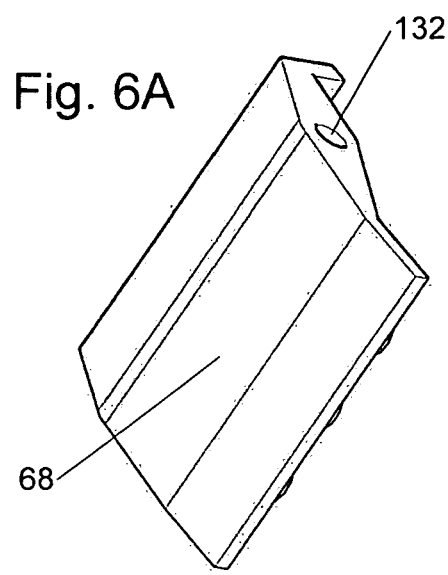
FIG. 6A shows an enlarged top right view of an embodiment of a clip as shown in FIG. 1C.

| DRAWINGS-Reference Numerals | |
|---|---|
| 32 | Second housing base |
| 33 | Third Housing Base |
| 34A | Elevated ridge |
| 34B | Elevated ridge |
| 44 | Retractable Solar Clamp Installer and Railing Installation Guide (tool) |
| 46 | Adjustable Roof Seam Clamp |
| 48 | TORA |
| 50 | Safety Line Attachment Recess |
| 52 | Belt Clip |
| 54 | Belt Clip Screws |
| 56 | Allen Key holders |
| 58 | Roller Systems |
| 60 | Ruling |
| 62 | Roller Unit Recess |
| 64 | Level Bubble |
| 66 | Pivot pin |
| 67 | Pivot nut |
| 68 | Clips |
| 70 | Clip springs |
| 72 | Roller Recess Grooves |
| 74 | Clip Locking Grooves |
| 76 | Third housing |
| 78 | Second housing |
| 80 | First housing |
| 84 | Tape Measure Collector |
| 86 | Collector Velcro Straps |
| 88 | Centering Dot |
| 90 | Measuring Tape for "TORA" |
| 92 | Tape Measure Ruling |
| 94 | Articulating Arm Fastening Pin |
| 96 | TORA Main Assembly |
| 98 | Tape Measure Pinning Apparatus |
| 100 | Pinning Apparatus Fasteners |
| 102 | TORA Ruling |
| 104 | TORA To Ruler Slide Lock Attachment |
| 106 | Ruler Slide in seam |
| 108 | Roof Seam Clamp Seam Tightener and Grip |
| 110 | Seam Clamp Main Housing |
| 112 | Tightening Bolt |
| 114 | Tightening Bolt Locking Pin |
| 116 | Tightening Lever |
| 118 | Rotating Lock Pin and Bearings |
| 120 | Seam Clamp to Ruler Bolt |
| 122 | Seam Clamp Attachment Hole |
| 124 | Roller Housing Assembly Screws |
| 126 | Roller Housing Assembly |
| 128 | Clip Spring Guides |
| 130 | Spring Guides |
| 132 | Pivot Pin Clip Sleeve (Guide) |
| 134 | Roller |
| 136 | Rail |
| 138 | L-Brackets |
| 140 | Roller Pins |
| 142 | Roller Assembly Recess |
| 144 | Seam Clamp Rotation Locking Pin Bearings |
| 146 | Swivel Bolt Pin Guide hole |
| 148 | Tightening Bolt Locking Pin Guide Hole |
| 150 | Seam Clamp Rotation Locking pin Guide Hole |
| 152 | S-5 Clamp |
| 154 | Bolts |
| 156 | Washer |
| 160 | Standing Seam Roof |
| 162 | Exterior of Home (Walls) |
| 164 | Rail Ruler Assembly |
| 166 | Standard Roof |
| 168 | Top of Roof(Peak) |
| 172 | level bubble compartment |
| 174 | Roof Seam |
| 176 | Pivot Pin Seating Compartment |
| 178 | Stucco Wall |

DESCRIPTION

Certain terminology is used in the following description for convenience only and is not limiting. The words "right", "left", "top", and "bottom" designate directions in the drawings to which reference is made. The words inwardly and outwardly refer to directions toward and away from, respectively, the geometric center of the retractable solar clamp installer and railing installation guide (tool) 44 in accordance with the present invention and designated parts thereof. The terminology includes words specifically mentioned above, derivatives thereof and words of similar import.

One embodiment of the invention is a retractable solar clamp installer and railing installation guide (tool) 44 where the tool as shown in FIG. 1A is arranged through a first housing 80, a second housing 78, and a third housing 76 that telescopically fit together.

Figure 14C:
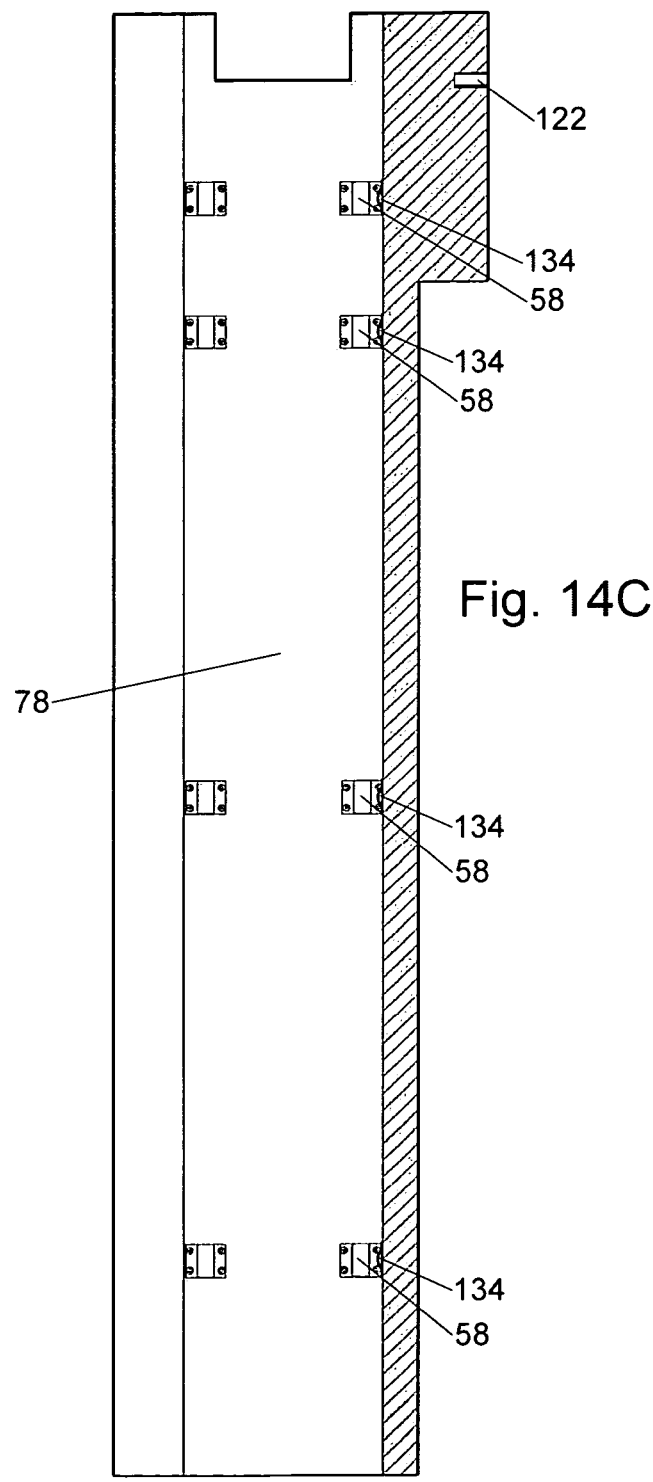
FIG. 14C shows a top plan sectional view of an embodiment of the second housing as shown in FIG. 14A.

Referring to FIG. 1A, the first housing 80 is shown in a perspective side view, engaging said second housing 78 and the third housing 76. The first housing is molded into a carved rectangular housing which accommodates the second housing and the third housing. Turning to FIG. 1C, the first housing 80, second housing 78, and third housing 76 are found adjacent to one another and have different widths and thickness to enable the installer to engage the third housing into the second housing and the second housing into the first housing. It further should be noted that when measurements are desired the tool is extended outwardly from the first housing 80 and toward the distal end of the third housing 76. The widest interior section is found in the first housing 80 because it accommodates the second housing 78. Once engaged, the second housing lies adjacent and nearly flat against the first housing interior surface but is separated by a roller systems 58 of the first housing 80 and a series of roller recess grooves 72 found longitudinally along the second housing 78. The second housing is a carved out section with a smaller width than the first housing but has an elevated ridge 34A with a ruling 60 etched along the top surface of the second housing. As seen in FIG. 1A, the elevated ridge 34A on the second housing 78 fits snugly within the first housing 80 when in closed position and fills the partial gap found on the first housing top surface. When the tool 44 is in closed position, the first housing 80, the second housing 78, and third housing 76 create a relatively flat surface that can be laid across a roof top or other flat surface and may have a rubber coating. Turning back once again to FIG. 1C, the third housing 76 is not carved out and is composed of a solid rectangular like piece with an elevated ridge 34B. The ridge 34B is etched with ruling 60 along the top surface of the third housing 76. The third housing is slid into and fills the void within the second housing 78. The third housing 76, as illustrated in FIG. 15A, has the roller recess grooves 72 longitudinally along the length of the left, bottom, and right portions and comes into contact with the roller systems 58 found along the interior of the second housing 78 (FIG. 14C). The roller recess grooves 72 of the third housing are even in length and carved longitudinally along the housing 76. The roller recess grooves 72 extend from the distal ends of third housing base 33 to the proximal end, and engage roller systems 58 located throughout the second housing. Furthermore, as seen in FIG. 1C, the telescoping nature of the tool 44 used to install solar equipment on rooftop installations in this embodiment is achieved by using the roller systems 58 which slides along the roller recess grooves 72 and is ultimately secured through a clip 68.

Figure 6B:
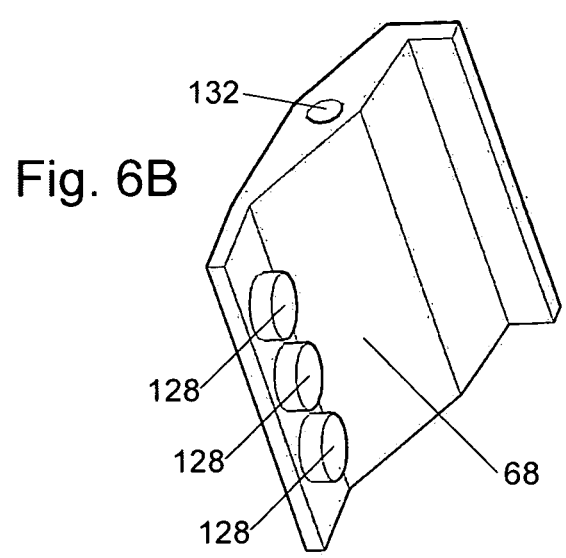
FIG. 6B shows a bottom left view of an embodiment of a clip with guides.

As seen in FIG. 1C-1D, the clip 68 of tool 44 is received into a rectangular opening near the distal ends of first housing 80 and second housing 78. The clip is secured to the tool with a pivot pin 66 and a pivot nut 67 that is received through a pivot pin sleeve guide 132 (FIG. 1D). Looking at FIG. 1C, the head of the pivot pin 66 is smooth along the length but is slightly threaded at the tip to engage pivot nut 67. The clip 68 pivots along the pivot pin 66 and pivot nut 67 when the clip is depressed or in a static position. Turning to FIG. 6A-B, the clip 68 has a rectangular aluminum wedge shape with varying degrees of thickness and a cavity at its center. FIG. 1D and FIG. 6B show clip 68 with a series of clip springs 70 securely connected to clip spring guide 128 located on the clip and spring guides 130 located on the tool 44. The clip springs 70 and spring guides 128 and 130 work together to create the necessary pressure for locking the clip onto a series of clip locking grooves 74. Looking at FIGS. 13A and 15A, the clip locking grooves 74 run longitudinally along the left surface of the second housing 78 and third housing 76, respectively, and are evenly spaced notches molded from a steel material. However, the clip locking grooves may be composed of copper, aluminum, zinc, iron, or other metal compounds that can be molded and attached to the housings.

Looking at FIG. 6B, the clip has clip spring guides 128 located under the clip 68. The clip springs 70 in this embodiment are made of stainless steel but can be made of carbon, chrome silicone, beryllium copper, phosphor bronze, or ceramics that can withstand pressure and fit securely onto the clip spring guides 128 and 130. The clip spring guides 128 and 130 secure the clip springs 70 between the clip and the first housing 80.

Figure 11A:
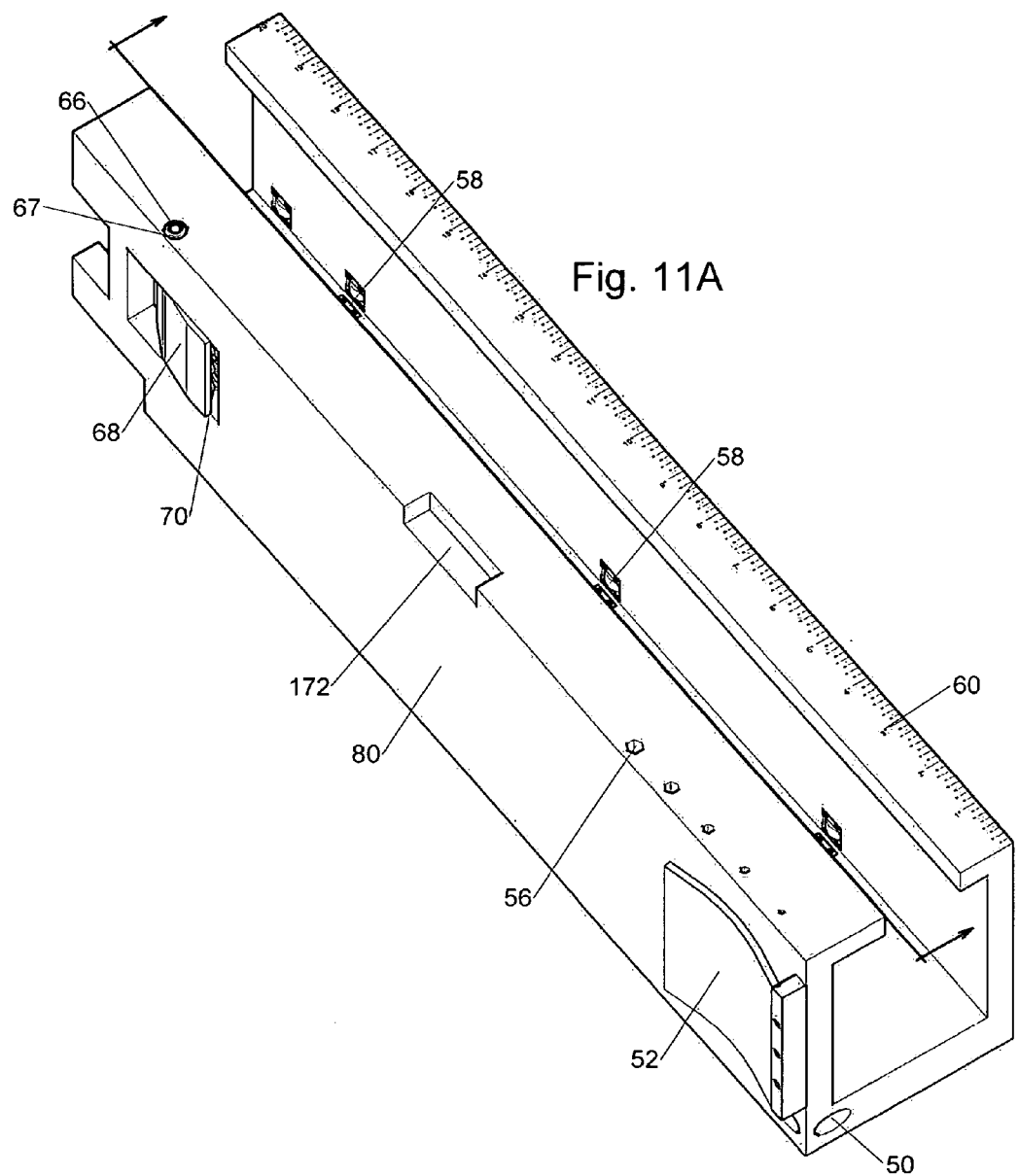
FIG. 11A shows a right perspective side view of an embodiment of an first housing of a preferred embodiment of the right side.
Figure 12A:
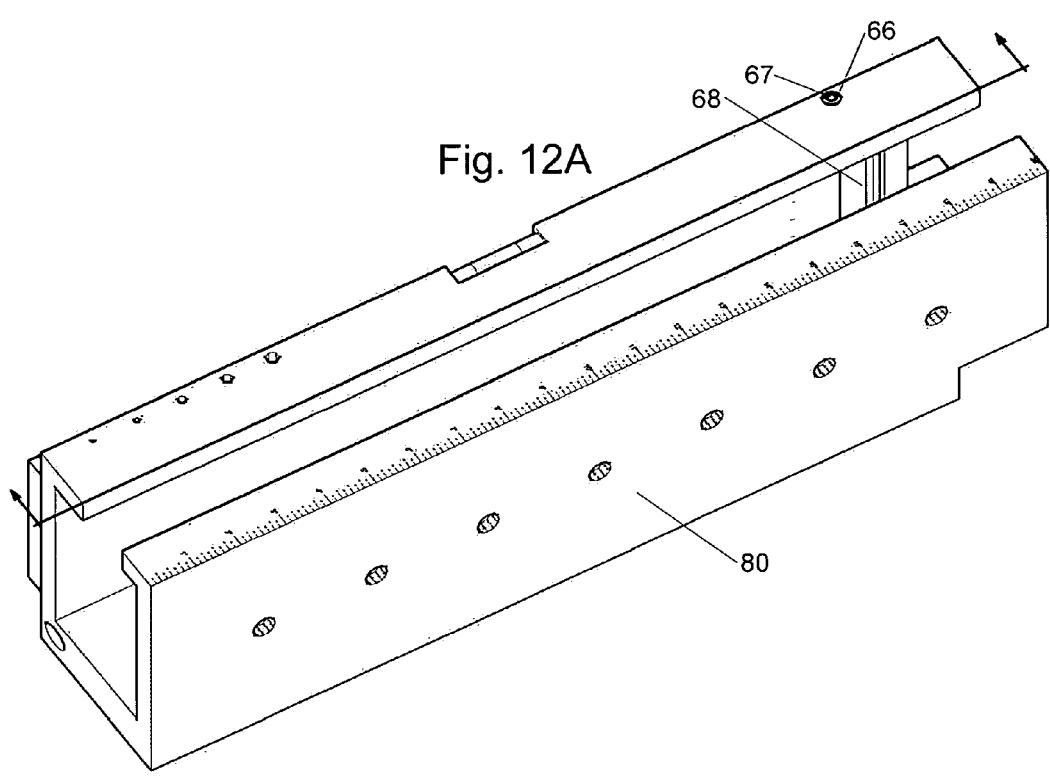
FIG. 12A shows an alternative perspective right side view of an embodiment of the first housing.
Figure 16A:
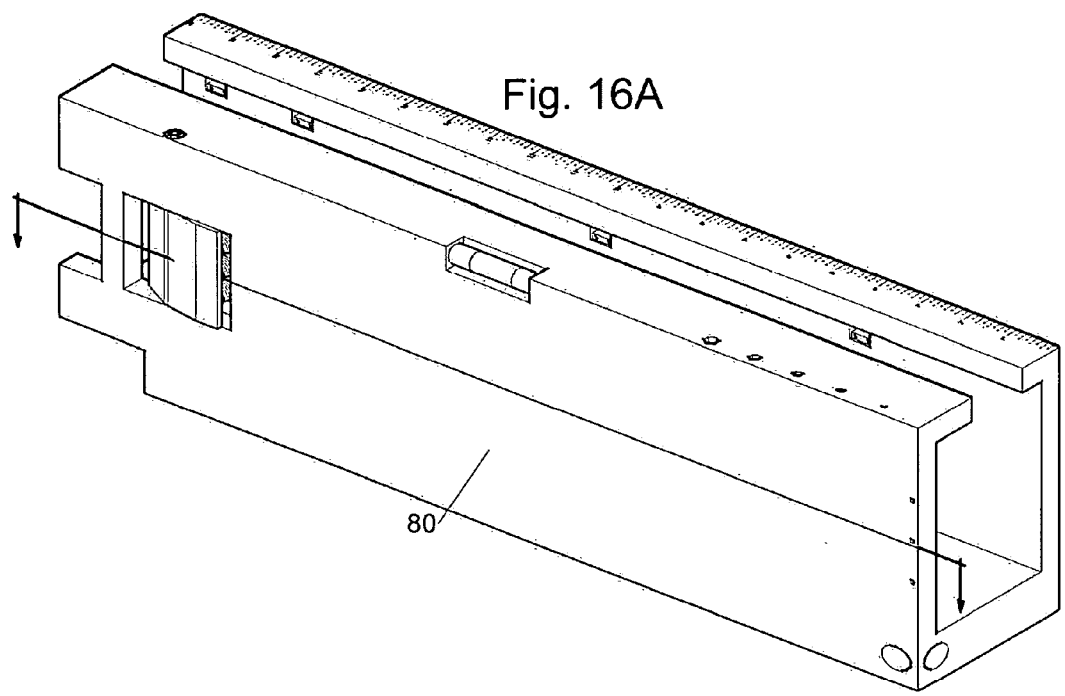
FIG. 16A shows a perspective side view of an embodiment of the invention with a first housing as shown in FIG. 1A.
Figure 16C:
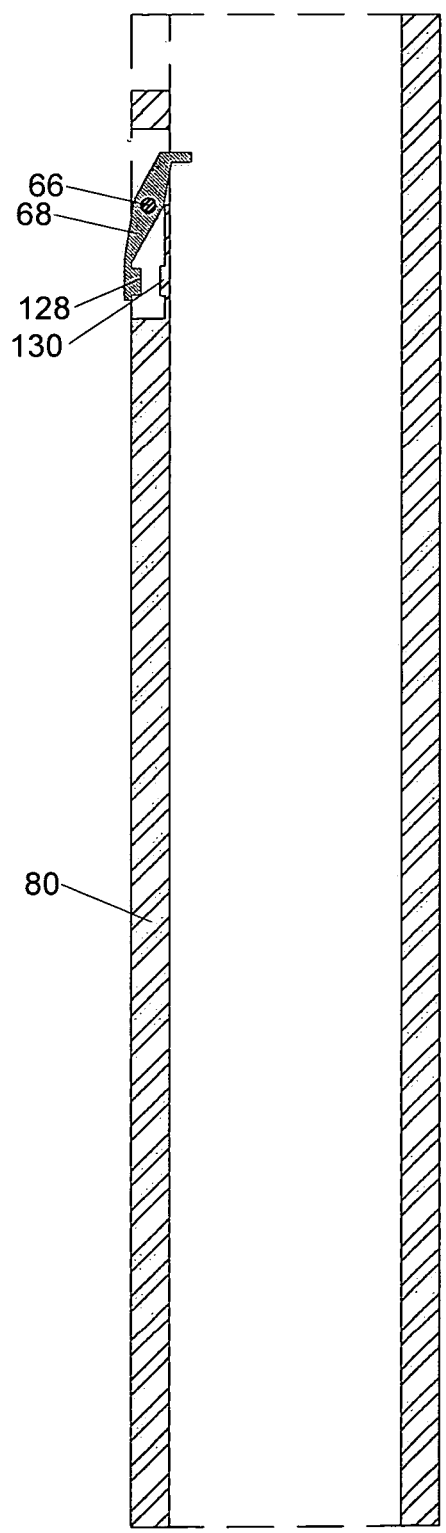
FIG. 16C shows a top plan sectional view of an embodiment of the invention with the first housing.
Figure 17C:
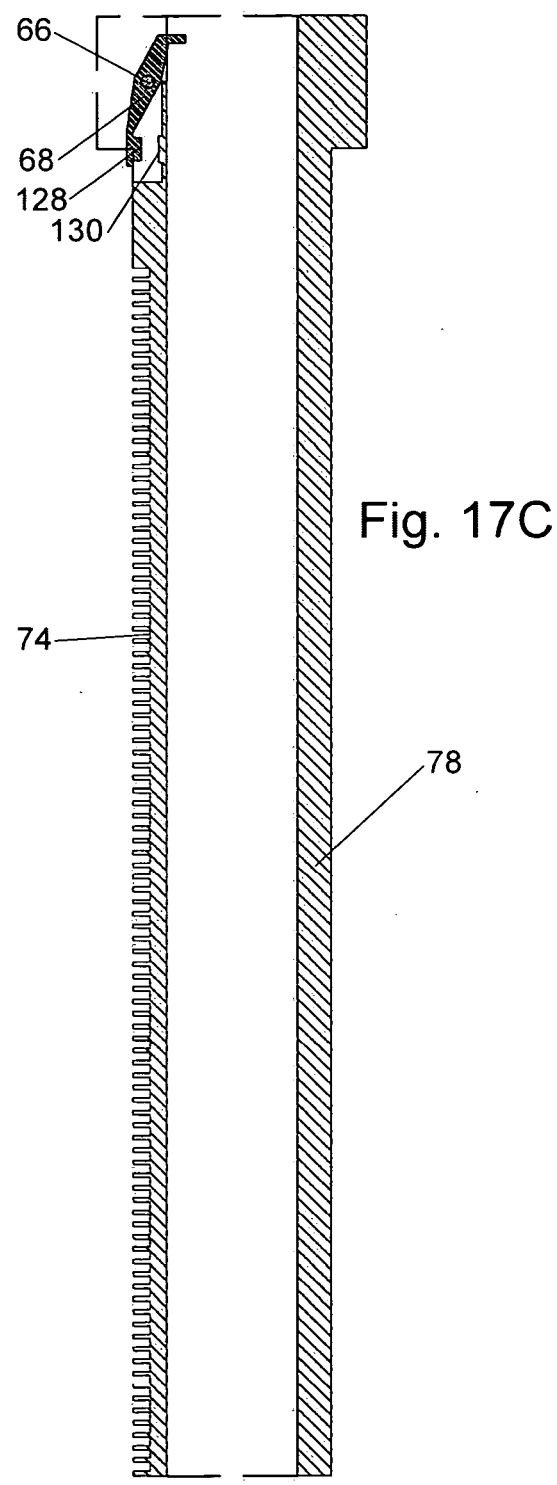
FIG. 17C shows a top plan sectional view of an embodiment of the second housing.

FIGS. 11A, 16A, and 16B show how the clip 68 is located at the distal end of the first housing 80 and is connected with pivot pin 66 and pivot nut 67 to the first housing 80. FIG. 16B shows a sectioned view of the first housing 80 and shows how clip 68 works with the pivot pin 66 and pivot nut 67 while guided by the clip spring guides 128 and spring guides 130. FIG. 4D shows the clip 68 of second housing 78 locking the third housing 76 into position when the tip of clip 68 engages the clip locking grooves 74 of the third housing. Another orientation of the clip 68 can be seen in FIG. 12A-C, which shows the clip 68 protruding through the distal walls of the first housing 80 when a constant tension is created via the clip springs 70 and spring guides 130 and 128. This enlarged view depicts the portion of the clip used to engage the clip locking grooves 74 of the second housing 78 (FIG. 17B). Now looking at FIG. 1D, the enlarged view illustrates that when clip 68 is depressed, pressure is released from clip locking grooves 74 but when the clip 68 is released the clip springs 70 and spring guides 130 push the tooth of clip 68 (FIG. 12C) between clip locking grooves 74 via a constant tension. Referring now to FIG. 17A-C, the clip 68 is secured onto the second housing base 32 and provides a detailed look at the evenly spaced notches of clip locking grooves 74 that run longitudinally along the left surface of the second housing 78. Moreover, the clip 68 of the first housing 80 is engaged identically by locking the clip 68 of the first housing 80 onto the clip locking grooves 74 of the second housing 78. In this embodiment, clip 68 is made of aluminum but may also be made of zinc, copper, steel, or metallic compound that can be shaped and molded without cracking. As previously noted, the telescoping interaction of the first housing 80, second housing 78, and third housing 76 is used to install solar equipment on rooftop installations and this is achieved by using the roller systems 58 which slide along the roller recess grooves 72 and are ultimately secured through the clip 68.

FIG. 11B-11E shows the first housing 80 with an assembly of roller systems 58 found within the first housing 80 which engage the roller recess grooves 72 found longitudinally along the second housing 78. In this embodiment the roller systems 58 are composed of a rectangular shaped roller unit recess 62 that is milled into the tool and houses a rectangular shaped roller housing assembly 126 which is inserted into the roller unit recess 62. Referring now to FIG. 1E the roller housing assembly 126 is a rectangular carved unit capable of accepting a set of roller housing assembly screws and a roller 134. The roller 134 is slid into place within the roller housing assembly 126 and a roller pin 140 is inserted and secured into the roller opening of roller 134. The roller pin 140 is fastened to the roller 134 whereby the roller can rotate and roll the tool when retracted along the roller recess grooves 72. The roller slides into the roller housing assembly 126 and the roller pin 140 goes in and through the roller. As the roller pin 140 reaches the other side it stops and locks as it becomes flush. Once the roller housing assembly 126 is assembled it is inserted into the roller assembly recess 142 and is attached with the roller housing assembly screws 124. The roller systems 58 described are only referred to as a preferred embodiment but other sliding mechanisms that would allow the housing to slide inward and outward from each other such as Teflon, lubricated surfaces, and slick material may be integrated into the tool 44. FIG. 11C shows a top exploded perspective view of an embodiment of the roller housing assembly 126 and the roller housing assembly 126 into the roller unit recess 62 of the tool 44. The roller housing assembly 126 is made of steel but can also be composed of zinc, copper, aluminum, or any hard material that is bendable and flexible. The illustration of the roller housing assembly screws 124 is not intended to limit the invention to screws but may be used with any other adhering devices that can secure the roller housing assembly into the respective housings. FIG. 11D shows an enlarged top perspective view of an embodiment of a roller system for clarity.

As shown in FIG. 11A, the first housing 80 is composed of the roller systems 58 placed in the first housing. Preferably the roller systems 58 are placed short distances from the proximal end of the tool, the center of the tool, and at the first housing distal end (the view in 11B shows the placement of the roller systems). FIG. 1A-1C illustrates the movement from a closed position to an open position, thereby depicting how the first housing 80 engages and slides along roller recess grooves 72 of the second housing 78. For clarity, FIG. 3A depicts the first housing 80 engaged with roller recess grooves 72 at the proximal end of second housing 78. Second housing 78 is engaged with third housing 76 via the roller recess grooves 72 while in an open position. Second housing 78 is joined to first housing 80 which has an opening at its distal end with a series of roller systems 58 for receiving and engaging the roller recess grooves 72 which are located longitudinally along the length of the second housing. In this embodiment the tool 44 comprising a first housing, second housing, and third housing is made of steel but may be made of aluminum, iron, plastic, composites, copper, carbon, chrome silicone, beryllium copper, phosphor bronze, or ceramics.

The interior of the second housing 78 is composed of roller systems 58. The exterior of the second housing 78 is composed of roller recess grooves 72 wherein the recess grooves are carved and located longitudinally along the length of the second housing exterior, with clip 68 engaged in clip locking grooves 74 along the length of the top, and a second housing base 32 that serves as junction point for third housing 76.

Figure 12D:
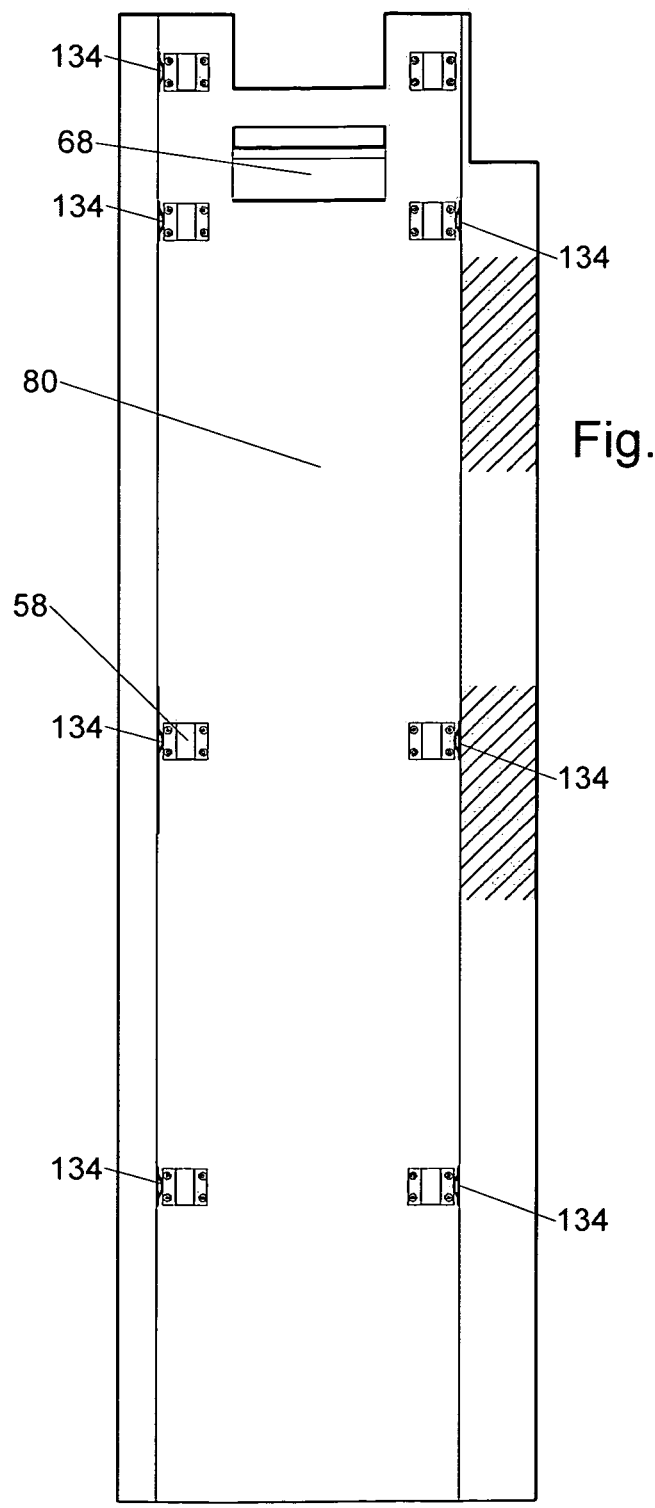
FIG. 12D shows a top plan sectional view of an embodiment of the first housing shown in FIG. 12A.
Figure 13B:
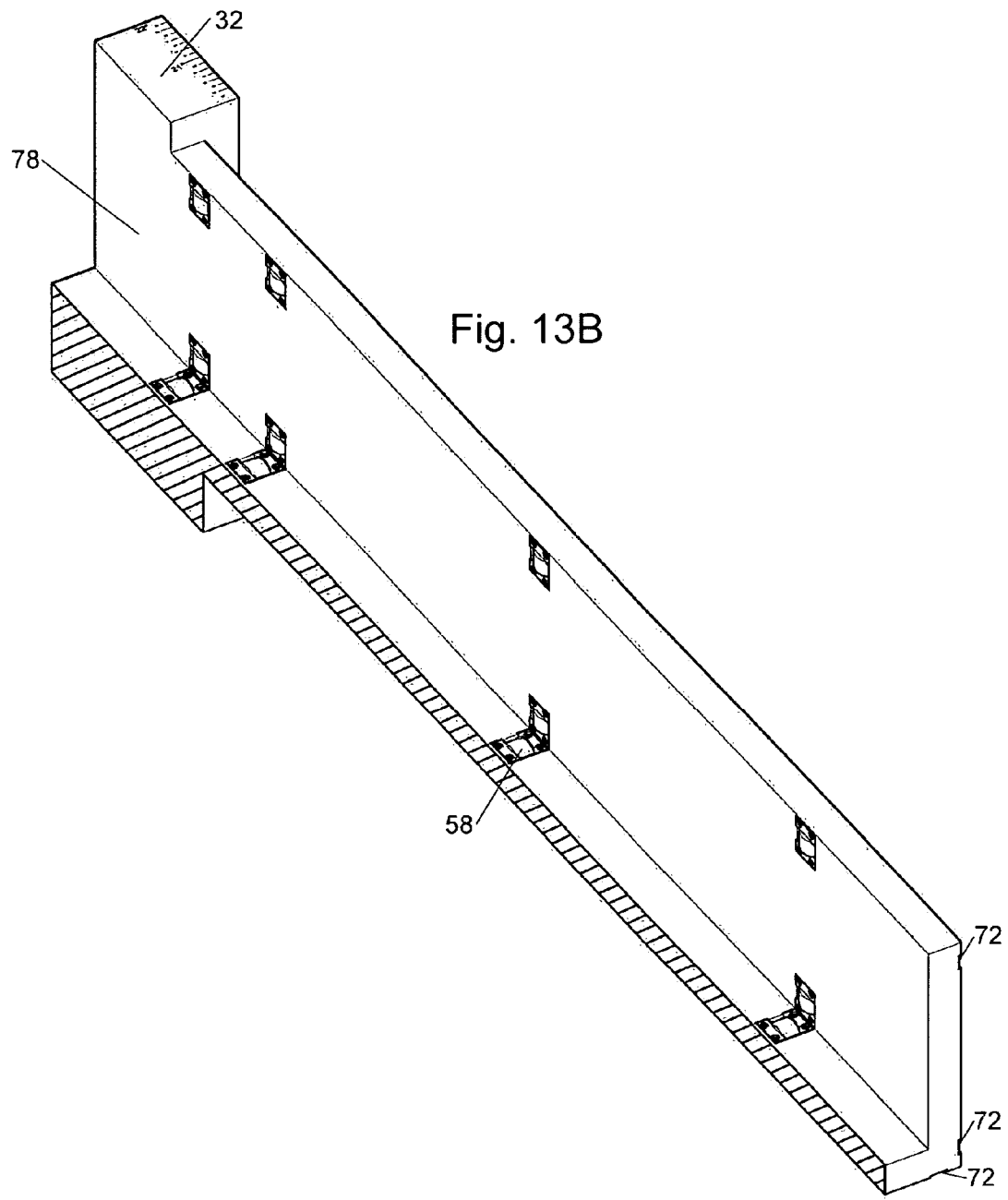
FIG. 13B shows a right sectional side view of an embodiment of the invention with a second housing as shown in FIG. 13A.
Figure 13C:
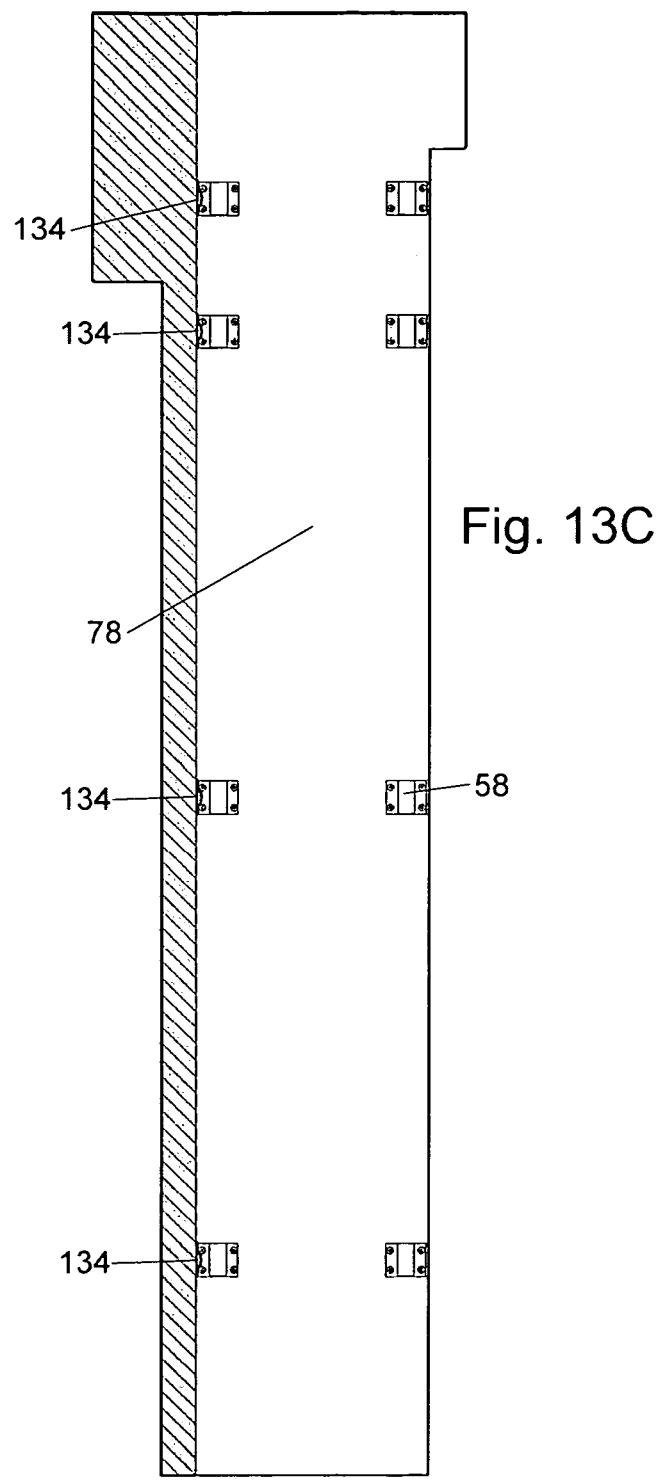
FIG. 13C shows a top plan sectional view of an embodiment of the invention with a second housing as shown in FIG. 13A.

FIG. 13A-13B shows the second housing with the roller systems 58 located along the interior. The roller systems 58 used throughout the second housing 78 are configured adjacent to one another to allow the smooth retraction of the second housing toward the third housing 76 and reduce friction against the roller recess grooves 72 of the third housing 76. The second housing 78 fits snugly within first housing 80 when inserted into the first housing distal end. The distal end of first housing 80 is carved out to allow such placement and interaction with the roller recess grooves 72 found longitudinally along the length of the second housing 78. Wherein the second housing 78 is also carved to allow the placement of the third housing 76 though its distal end. The roller systems 58 are placed lengthwise along the edges of the first and second housings, FIG. 12D and FIG. 13B, whereby roller systems 58 found within the first housing 80 slide along the roller recess grooves 72 of the second housing 78 when pulled outward toward the third housing 76. FIG. 14A illustrates an alternative right side perspective view of an embodiment of the second housing 78 as shown in the similar orientation of FIG. 3A. This view clearly depicts the roller recess grooves 72 found longitudinally along the length of second housing 78, which are used to engage the roller systems 58 of the first housing 80.

FIG. 14A-14C shows the second housing 78 with roller recess grooves 72 carved longitudinally along the length. The roller recess grooves 72 are even in length and carved longitudinally along the second housing 78, wherein the roller recess grooves are located on the exterior and positioned adjacently in two's near the first top proximal end. Further, the roller recess grooves 72 are singly positioned along the length of the exterior of the second top proximal end, and the roller recess grooves are positioned adjacently in two's near the first and second bottom proximal end. The roller recess grooves 72 extend from the distal ends of second housing base 32 to the proximal end, and engage the roller 134 of roller systems 58 located at the first housing 80 distal end and throughout the first housing. The second housing 78 enters at the distal end of the first housing, and terminates within the first housing when the second housing base is flat against the first housing distal end. The second housing 78 also has roller systems 58. FIG. 13B-C and FIG. 14B-D show the roller systems placed in the second housing. Preferably the roller systems 58 are placed short distances from the proximal end of the second housing, the center of the second housing, and at the second housing distal end where the third housing is received. It should also be noted that the roller systems 58 can be placed in multiple orientations within the second housing and may be installed prior to the assembly of the tool 44. Thus, the placement of the roller system 58 is one embodiment of the invention but should not be seen as a limitation because Teflon, oiled surfaces, and lined surfaces may also be used.

Figure 18B:
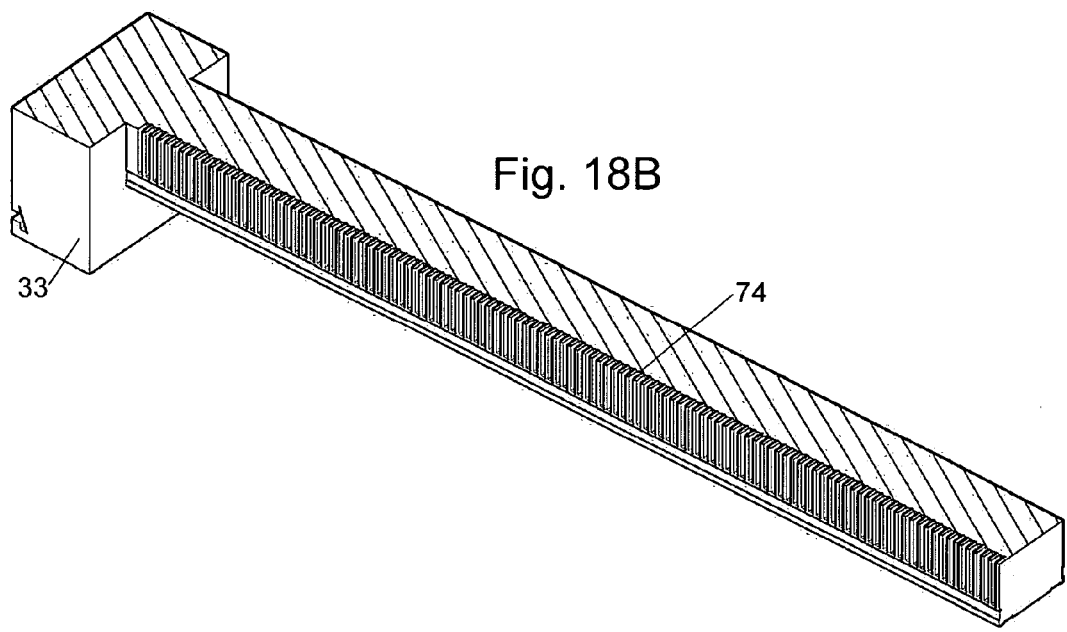
FIG. 18B shows a perspective sectional side view of an embodiment of the third housing with clip locking grooves.
Figure 18C:
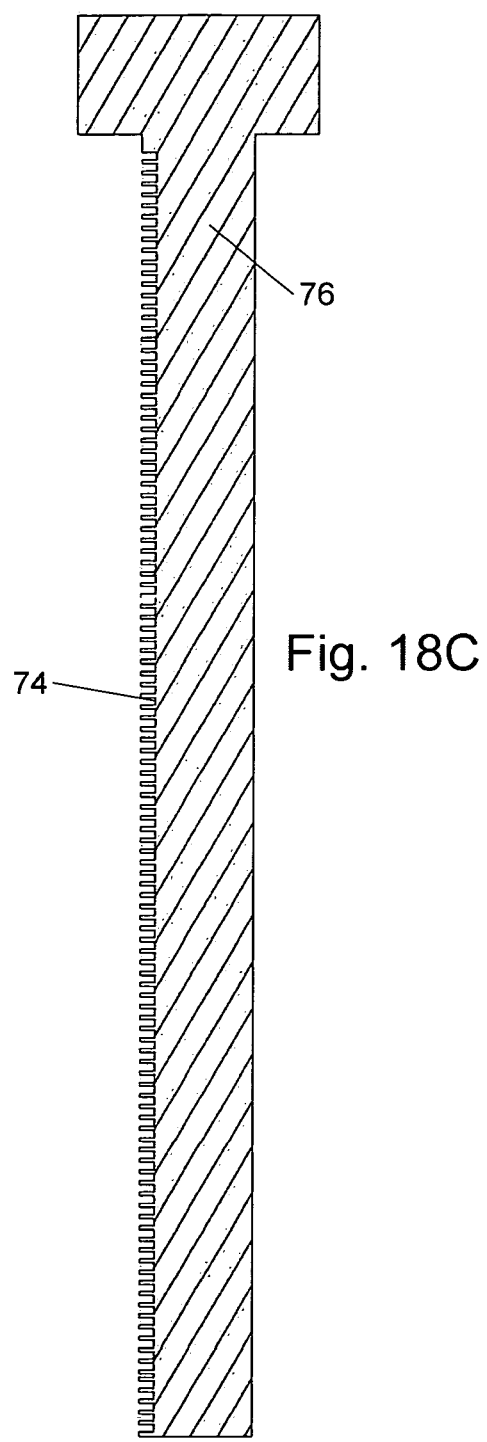
FIG. 18C shows a top plan sectional view of an embodiment of the second housing.

FIG. 18A shows a perspective side view of an embodiment of the third housing 76 before being sectioned. FIG. 18B shows a perspective view of an embodiment of the third housing 76 with clip locking grooves 74 longitudinally along the left exterior used as a point of attachment for the clip 68 found on the middle housing base 79. The clip 68 of the second housing base 32 locks into place because the tension created between the 128 and 130 holds and secures it. FIG. 18C shows a top plan sectional view of an embodiment of the third housing whereby the clip locking grooves 74 are evenly spaced to accommodate the clip 68 of second housing base 32.

FIG. 11A shows a right perspective side view of an embodiment of the first housing 80 with all its components. For instance, this view shows that the first housing 80 is an elongated rectangle with ruling 60 beginning on the proximal end of its top surface and continuing in sequence to the distal end of the top surface. The tool 44 is not limited to a rectangular orientation but may also be squared shaped or flattened as long as installing equipment on high locations is accomplished. The ruling 60 (FIG. 1B) is measured in inches but other measurements may be used to fit the systems being installed, and may be etched into the steel with a black ink. Moreover, the proximal end of the first housing 80 shows a belt clip 52, in the shape of a square with an attaching apparatus, wherein the tool 44 is attached by a series of belt clip screws 54. Referring to FIG. 1C, an exploded perspective side view of the tool 44 is shown wherein the belt clip screws 54 are inserted into the walls of the first housing 80. In this embodiment the belt clip 52 is attached to the first housing 80 with screws 54 but the belt clip 52 may be welded or secured through other means to the first housing 80. In this embodiment the belt clip 52 is attached to the first housing 80 with screws 54 but the belt clip may be welded or secured through other means to the first housing 80. The belt clip 52 is composed of a steel but may be made of aluminum, composites, copper, hard plastics, stiff rubber, and any other pliable material that can maintain its from and secure the tool 44 to an installer. The first housing 80 also has a safety line attachment recess 50 that secures the tool 44 to a safety line. The safety line attachment recess 50 is located adjacent to the belt clip 52 and can be drilled in or sectioned out through the use of a mill. The safety line is inserted through the safety line attachment recess 50 and may be secured to the roof of the install. As shown in FIG. 11A the first housing 80 has a series of allen key holders 56 along the top surface of the first housing 80 which may be milled out, carved, or drilled into the first housing. These are not only particular to allen keys but can be used for any other keys such as hex keys or ratchet assemblies designed to tighten and loosen equipment. The first housing 80 has allen key holders 56 that may be used for holding allen keys while on roof top installations. The allen key holders 56 are adjacent to a level bubble 64 and level bubble compartment 172 that is inserted on the first housing 80. The level bubble 64 may be used to determine if installed equipment is level and may be inserted into the tool 44 before or after assembly.

Now turning to FIG. 4A of the tool 44 which shows the first housing 80 containing a series of seam clamp attachment holes 122 whereby an adjustable roof seam clamp 46 is engaged to the bottom center of the first housing 80 and the bottom center of the third housing base 33. It further should be noted that the adjustable roof seam clamp 46 is inserted into the tool 44 after it is in a locked position. Now looking at FIG. 2A-2D, the tool 44 is shown in an open position with an adjustable roof seam clamp 46 attached to the bottom of the first housing 80. The adjustable roof seam clamp 46 in the embodiment of the invention is made of steel but can be made of aluminum, copper, bronze, iron, tin, titanium, nickel, or any other material that can be molded or shaped into parts that can grasp a standing seam roof. The adjustable roof seam clamp can be square shaped but may also be in other shapes as long as it can grasp onto the seam of a roof. Thus, the tool 44 has securely engaged the adjustable roof seam clamp for placement onto a roof top.

Now looking at FIG. 4A-4D, Top of Roof Attachment (TORA) 48 is connected to the third housing base 33 via a TORA to ruler slide lock attachment 104. The third housing 76 has an adjustable roof seam clamp inserted into the series of seam clamp attachment holes 122 found on the bottom center of the third housing 76. The series of seam clamp attachment holes 122 are milled lengthwise along the bottom center and right center side of said first housing 80, and at least one series of the seam clamp attachment holes 122 are located on the bottom center and right center side of said second housing base 32, and at least one series of seam clamp attachment holes 122 can engage and secure the adjustable roof seam clamp 46. Now turning to FIG. 5, this view shows the location of the seam clamp attachment holes 122 on all respective views of the tool 44, where the seam clamp attachment holes are positioned to allow the installer to engage the adjustable roof seam clamp 46 when the tool is placed in an upright position or on its side. This figure illustrates a bottom right toward perspective view of an embodiment of the first housing 80. This embodiment shows seam clamp attachment holes 122 which serve as entry points for the adjustable roof seam clamp 46. These holes can be milled prior to the assembly of the tool but may also be created after. Turning to FIG. 7A, the adjustable roof seam clamp 46 is composed of a seam clamp to ruler bolt 120 that inserts into seam clamp holes 122. The preferred embodiment describes the use of the tool 44 in conjunction with my newly devised adjustable roof seam clamp but may be adjusted to accommodate other seam clamps on the market.

Figure 7B:
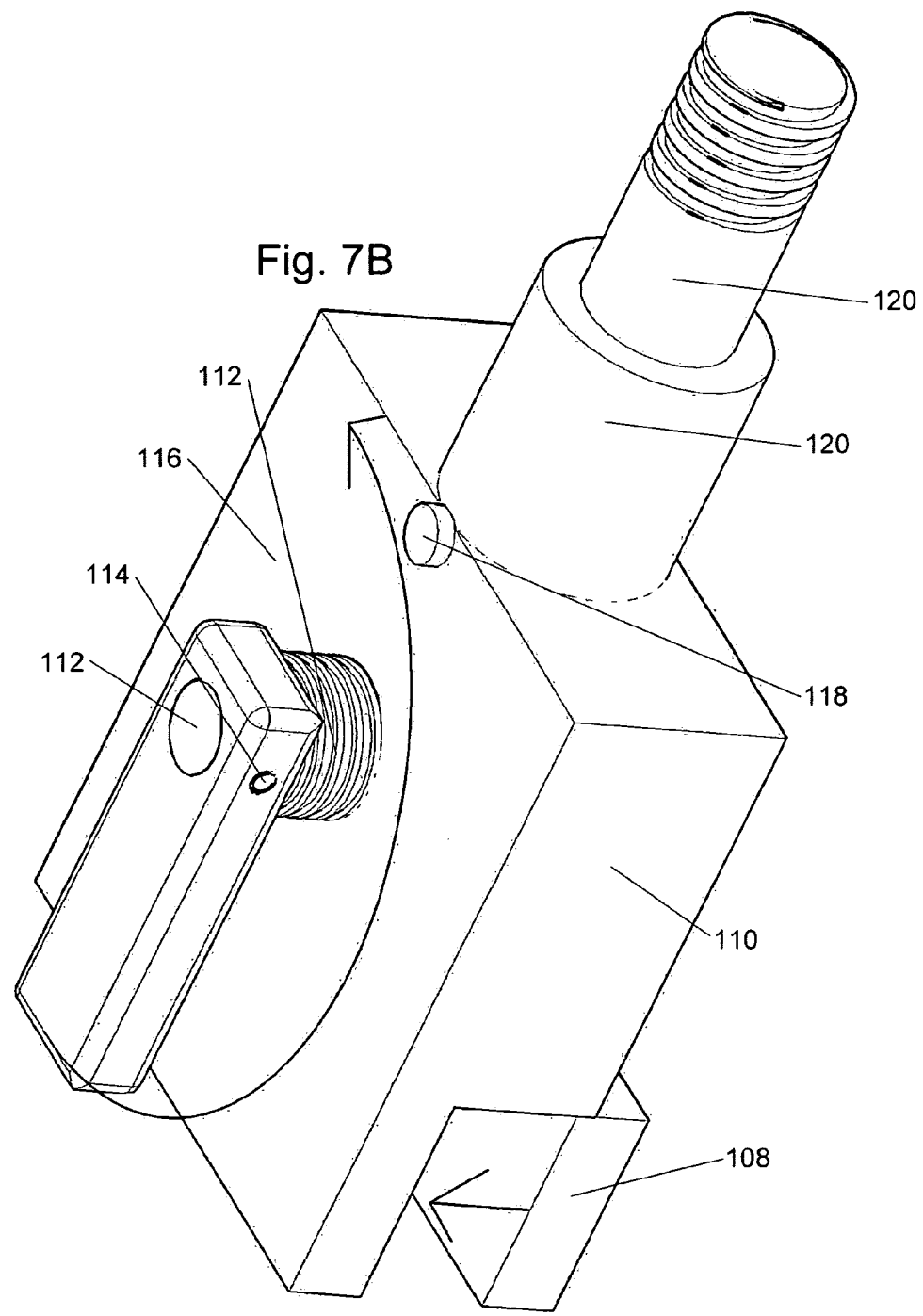
FIG. 7B shows a top right perspective view of an embodiment of the adjustable roof seam clamp of FIG. 7A with moveable tightening lever in loosened position.
Figure 8:
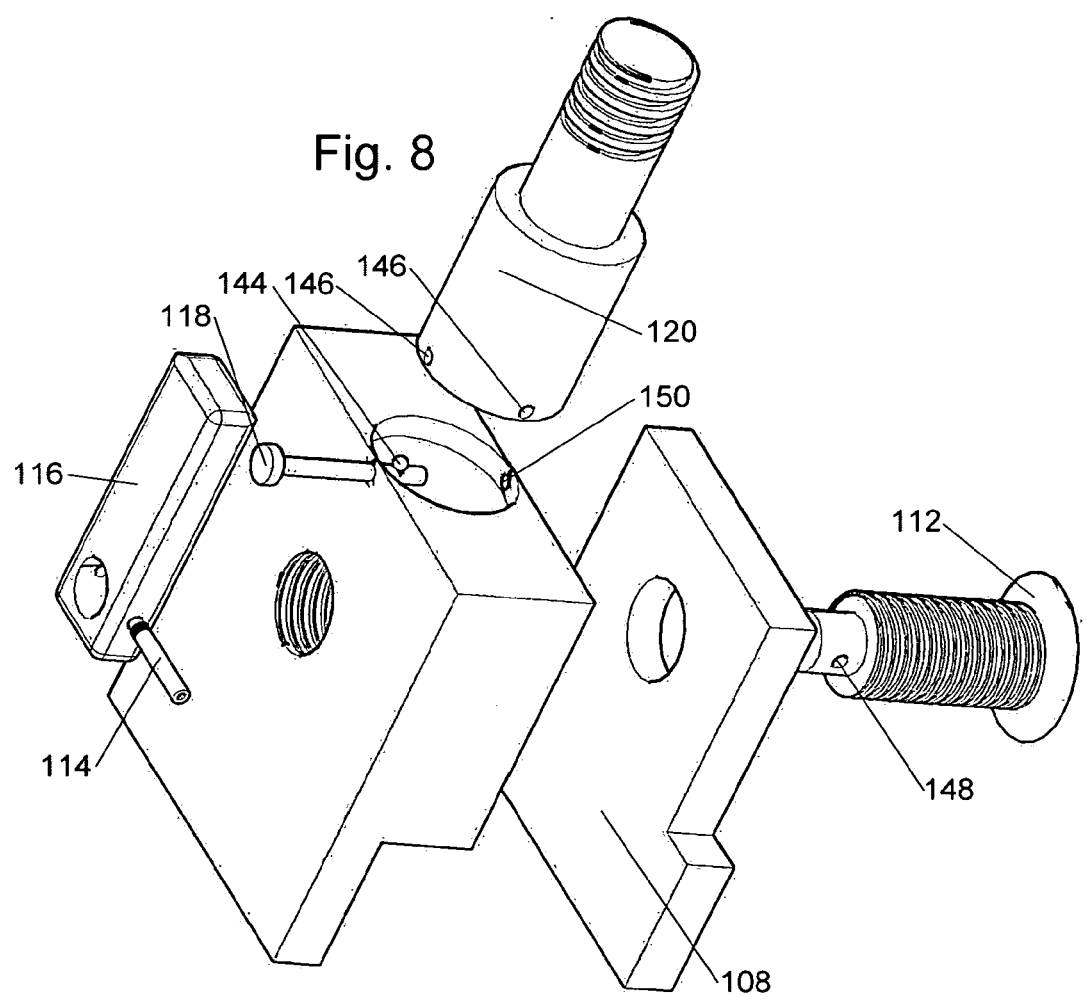
FIG. 8 shows an exploded view as depicted in FIGS. 7A and 7B.

FIG. 7A-7B, shows a squared adjustable roof seam clamp 46 in tightened position by demonstrating the movement of a roof seam clamp seam tightener and grip 108 via a tightening fastener 116. The roof seam clamp seam tightener and grip 108 is connected to a seam clamp main housing 110 via a tightening bolt 112. The tightening bolt 112 has a tightening bolt locking pin 114. In turn, tightening bolt locking pin 114 is used to secure bolt 112 to a tightening lever 116. Turning to FIG. 7B, the lever 116 is loosened, and moves a roof seam clamp seam tightener and grip 108 out, therefore allowing for an easy grasp of a standing seam roof. It should be noted that the predetermined flat design of grip 108 attaches to a seam of a roof evenly reducing the risk of tearing the roof.

Figure 9A:
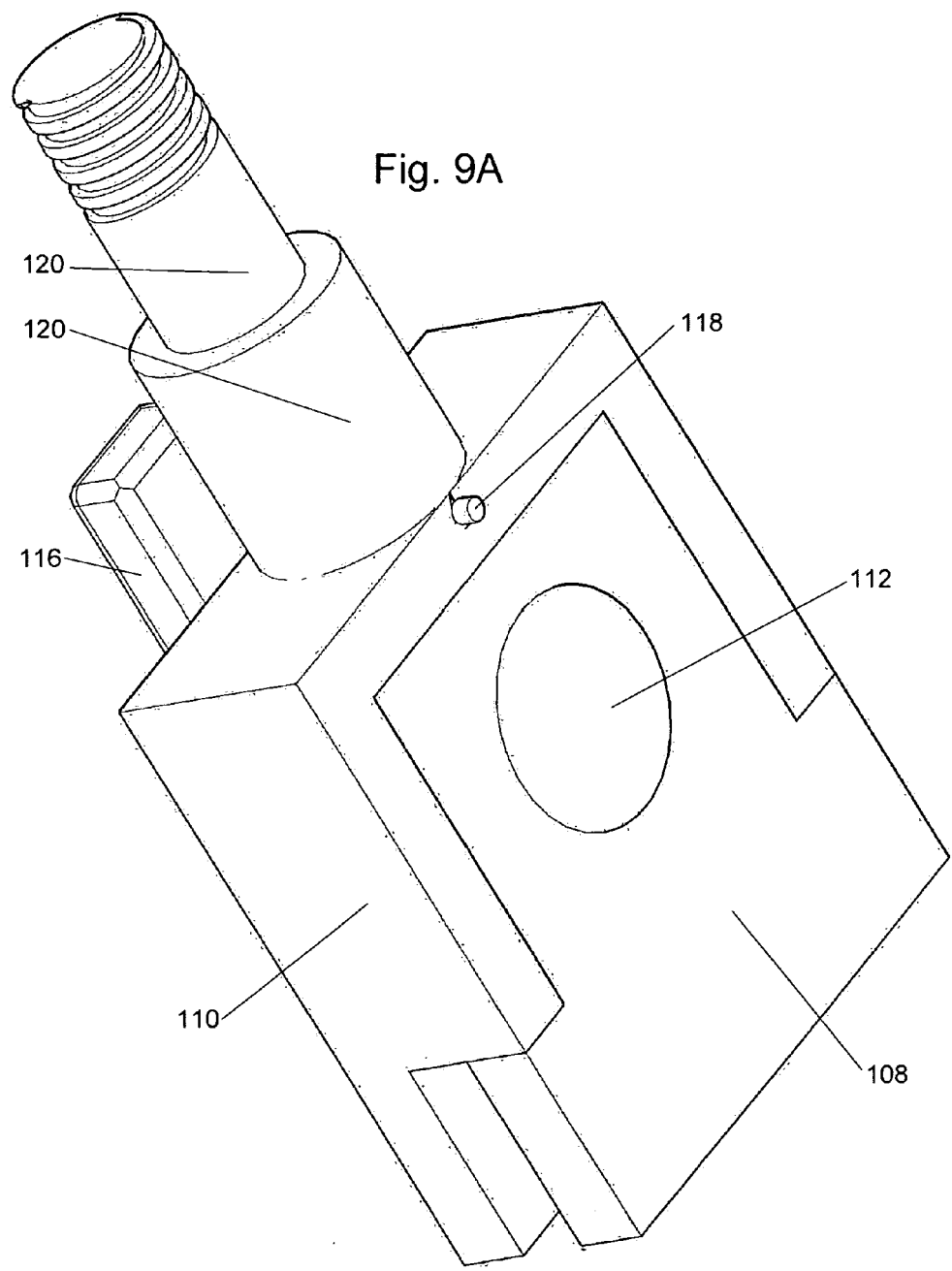
FIG. 9A shows an alternative perspective side view of an embodiment of the invention.
Figure 9B:
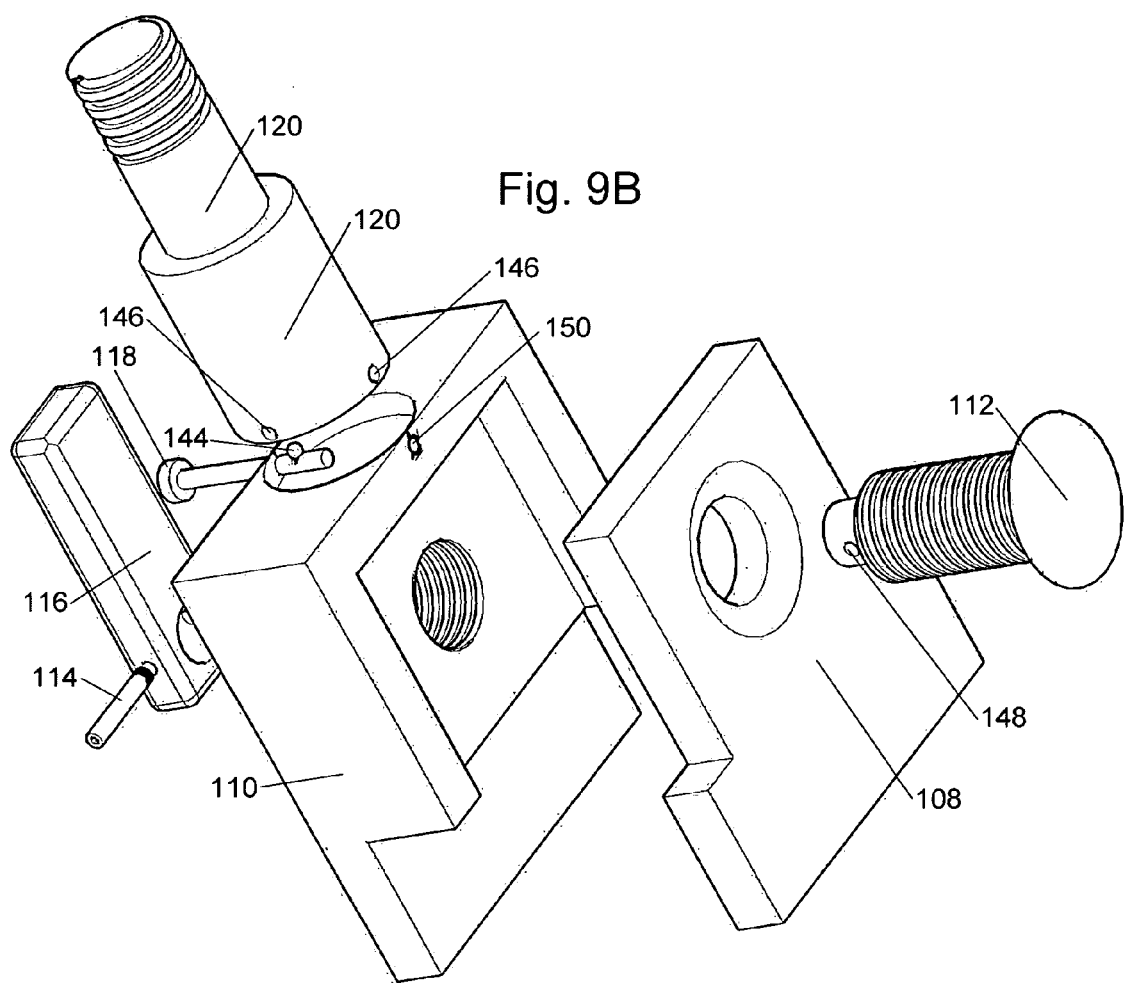
FIG. 9B shows an exploded perspective side view of an embodiment of the present invention.

Moreover, the adjustable roof seam clamp 46 has a rotating lock pin and bearings 118 with rotation locking pin bearing 144 that can be inserted into a swivel bolt pin guide 146. The rotating lock pin 118 then secures the installer bolt 120 via the swivel bolt pin guide 146 which can also accept rotation locking pin bearings 144 on either pin guide 146, therefore a secure insertion into the seam clamp attachment holes 122 is created. Additionally, rotating lock pin 118 consists of a unique pin system that can be removed and allow for a different attachment at different locations and angles when used with seam clamp rotation locking pin guide hole 150. FIG. 9A-9B shoes a clearer representation of the adjustable roof seam clamp 46 positioned in the orientation of FIG. 3C, while inserted into the first housing 80 of the tool 44. The depiction further illustrates how the grip 108 prevents over tightening because the threaded acceptor of the seam clamp main housing 110 protrudes and creates a barrier. Tightening bolt 112 passes through roof seam clamp tightener and grip 108 and seam clamp main housing 110 and terminates in tightening lever 116. This orientation in turn allows tightening bolt locking pin 114 to enter through tightening bolt locking pin guide hole 148 therefore locking tightening bolt 112 into tightener and grip 108 and seam clamp main housing 110. The tightening bolt 112 is a fully threaded pin with a conical end and the smooth distal end to easily enter the recess of lever 116. It further should be noted that the cone gives you more surface area to push down on tightener and grip 108 so that tightener and grip 108 is grasping the seam without the risk of marring or breaking through. In this embodiment the tightening bolt 112 is only tightened as far as it is received by tightening lever 116. Once tightened, threaded acceptor of seam clamp main housing 110 protrudes and creates a barrier. Now seam clamp rotation locking pin guide hole 150 allows seam clamp to ruler bolt 120 to lock into the correct angle because you only want it at 90 degree angles. Once the cone tightening bolt 112 reaches the final point, grip 108 closes onto the seam and can withstand winds of up to 120 mph. As tightening bolt tightens seam clamp seam tightener moves out.

Figure 10A:
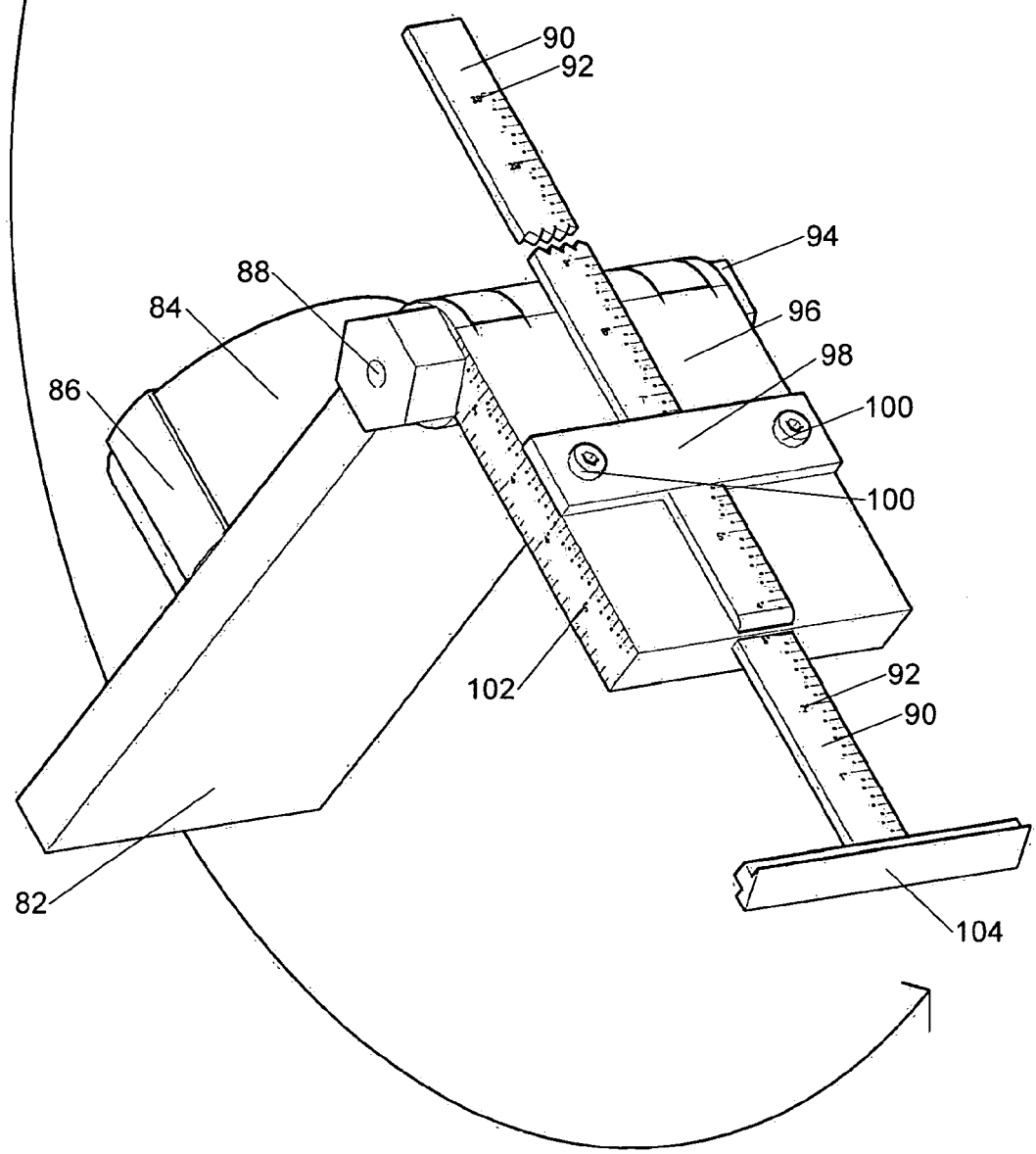
FIG. 10A shows top right toward perspective view of an embodiment of the roof attachment of FIG. 2B extended 90 degrees.

FIGS. 10A, 10B, and 10C another embodiment of this invention through a Top of Roof Attachment (TORA) 48 extended 90 degrees. The TORA is composed of a TORA to ruler slide lock attachment 104, which is perpendicular to an attached to a measuring tape for TORA 90. The TORA to ruler slide lock attachment 104 is used to lengthen the tool 44 via a sliding action on a ruler slide in seam 106. The measuring tape for TORA can be made of a flexible material that is sturdy enough to withstand pressure from a series of pinning apparatus fasteners 100 while making measurements in inches, centimeters, or any value necessary for the installation. The measuring tape for TORA runs along a TORA main assembly 96 which secures a tape measure pinning apparatus 98 through the pinning apparatus fasteners 100. These fasteners can be pins or clips designed to hold down the measuring tape with applied pressure. The measurements are taken through a tape measure ruling 92 or a TORA ruling 102 found on the TORA main assembly 96. These measurements are used as a secondary source if the measuring tool needs to be elongated. The measuring tape for TORA 90 is held in place by pinning apparatus fasteners 100 which are secured to tape measure pinning apparatus 98 over a TORA main assembly 96. An articulating arm fastening pin 94 is inserted to centering dot 88 and connects the TORA main assembly 96 to a TORA articulating base 82. The TORA also has a measure tape collector 84 with Velcro straps 86 located on the top portion of articulating base 82. The measure tape collector in the embodiment is made of synthetic plastic found at local hardware stores it may also be composed of aluminum, resin, composite, copper, or other synthetic material that can be molded and flexible without breaking. In addition, the mention of Velcro straps is one embodiment of the present invention but other like material such as fastener straps, button straps, clips, and seat belt buckles may be used to secure the tape measure. The main assembly 96 and the TORA articulating base 82 in the embodiment is composed of steel but can be composed of copper, zinc, lead, aluminum, wood, plastic, rubber or other like material that can be hardened and molded to secure the tool 44 to the top of a roof. FIG. 10B shows a top right perspective view of an embodiment of the TORA 48 in closed position whereby the TORA to ruler slide lock attachment 104 is seen retracted and the tape measure collector 84 is secured under the TORA articulating base 82 of TORA. FIG. 10C illustrates a top right exploded view of the TORA whereby all parts are extended and in working orientation.

FIG. 19-21B, illustrates the method of use of the tool. FIG. 19 shows a seam clamp on a standing seam roof, the installer will begin the installation by taking the tool 44 and measuring the required distance between the two rails or between the rail 136 and the roofs edge as seen on the exterior of the home (brick) 162 from a standing seam roof 160. Once this predetermined distance is established via the extension of the second housing 78 and third housing 76, the installer can now take the adjustable roof seam clamp 46 and insert it into the seam clamp holes 122 via the seam clamp to ruler bolt 120. After the seam clamp is in position, the installer easily takes the tool 44 with the adjustable roof seam clamp 46 inserted and places it on the seam of the roof 128. At this point the installer can hold the tool down with his foot or hand. Unlike the present technology, only one installer is needed for this step and the seam clamp is not constantly falling off of the roof 160 because the tool 44 holds the adjustable roof seam clamp 46 in place and frees up the installers hand to tighten the roof seam clamp to the seam 128. The installer simply moves the tightening lever 116 of the adjustable roof seam clamp 46 and roof seam clamp seam tightener and grip 108 grasps the seam 128 for a sturdy hold. The figure also illustrates how the tool will hold the S-5 Clamp 152 in place while an L-bracket is bolted by a bolt 154 and washer 156 into the clamp 152. Moreover, the technology being utilized by the roof seam clamp prevents the installer from over tightening because the seam clamp is equipped with a tightening bolt technology with a large surface area which grabs surfaces evenly and prevents rubbing of unlubricated areas. In addition, FIG. 20 illustrates how an installer would use the tool to install railing on a standard roof 166. First the installer would measure the appropriate distance followed by installing the L-brackets 138 and bolt 154 for the bottom rail 136. The next step would require an additional installer because the installer would need two tools to place between the installer rail 136 and the L-brackets 138 up to the new rail 136B. The necessary distance between the tow rails is locked into position. Now the installer uses the bolt 154 to secure the railing down by using the allen keys on the tool 44. Both installers hold their respective tools in locked position while the rail is held in place against the previously installed rail.

Figure 21A:
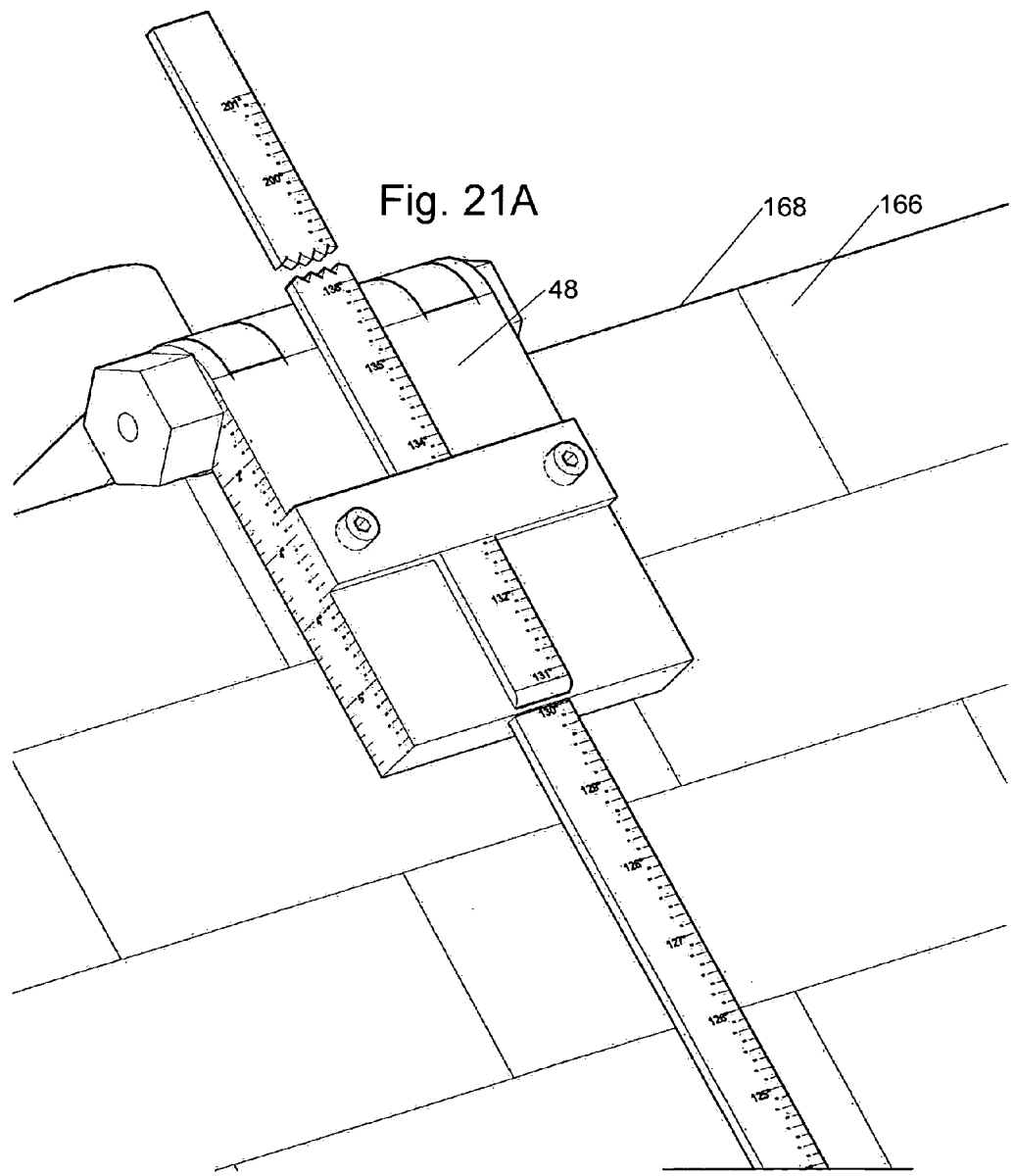
FIG. 21A shows an illustration of an embodiment of the invention with a roof attachment on top of the roof.

Looking at FIGS. 21A and 21B we can see that if the tool requires an additional measurement that is longer than the distance of the tool 44, a Top of Roof Attachment (TORA) 48 can be used. The figures show that the installer can attach the TORA 48 to the tool 44 thereby extending the distance the tool can measure. The use of the TORA 48 involves measuring the distance from the top of the roof 168 down to the edge of the roof 162. Before the TORA 48 is placed a top of the roof, the installer inserts the TORA to ruler slide lock attachment 104 into the ruler slide in seam 106 thereby creating an elongated tool 44. The ruling 60 of the tool is continued along the tora tape measure ruling 92 and this provides the installer sufficient measuring capabilities. Now that the TORA is attached to the tool 44, the installer can use the tape measure ruling 92 with the measuring tape for TORA 90 housed within the tape measure collector. The installer takes the tape measure and secures it with the tape measure pinning apparatus 98 located on the TORA main assembly 96. In this embodiment the installer can use the allen key holders 56 located on the first housing for tightening the tape measure pinning apparatus 98. The tape measure pinning apparatus 98 may be tightened with other mechanisms for securing such as fasteners, pins, or screws. In addition, if the installer is at an angle where measuring the distance with the tape measure ruling 92 is unfeasible he/she can use the centering dot 88 found on the articulating arm fastening pin 94 for measuring the distance with the TORA ruling 102.

Operation

The manner of using the retractable solar clamp installer and railing installation guide (tool) 44 is similar to the use of present technology only with respect to measuring the distances between rails for S-5 clamp placement. Presently 2×4's are cut and measured to use as templates for placing S-5 clamps on a standing seam roof. For instance, the 2×4's measure a distance from the bottom of the roof to the top. Once the distance is measured, one installer holds the 2×4 in place to secure the first S-5 clamp on the seam. Next, the bottom S-5 clamp is tightened to the seam and the 2×4 on top of the seam is used to hold the loose S-5 clamp toward the top of the seam. The only similarity between the present method of installing seam clamps to roof seams is that my invention also measures distances for seam clamp placement and installation. However, unlike the present method of installing the S-5 clamps; my invention possesses unique properties that allow for the quick, efficient, and safe installations for solar roof tops.

When using the tool 44, the installer can measure distances for proper rail placement, seam clamp placement, L-Bracket placement and maintain his/her safety. As seen in FIG. 1A the tool is composed of an first housing 80, second housing 78, and an third housing 76. FIG. 19 illustrates a method of using the tool on a standing seam roof. These elements of the tool work together to achieve the goals of the mentioned invention. As seen in the figure, the tool is laid flat on the rooftop and is measuring the distance from the edge of the roof 162. FIG. 20 shows an extended tool for measurement purposes on a non-standing seam roof and a stucco wall 178. Here, the tool is placed between two rails 136A and 136B. The tool 44 is extended while the first housing is in a flat position against the rooftop. In order to extend the tool 44 the clip 68 on the first housing is pushed down while the installer pulls the second housing 78 out toward the third housing 76. At this point, the first housing clip 68 disengages from the clip locking grooves 74 located on the second housing because the pressure applied by the clip springs and spring guides onto the clip locking grooves is released as the clip pivots along the pivot pin and pivot nut. Once the clip 68 on the releases the tension applied to the second housing grooves. Once the clip 68 on the of first housing 80 disengages the clip locking grooves 74 on the second housing 78; the second housing slides out of the first housing via the roller system 58 found within the first housing 80. The placement of a roller system 58 through the length of the first housing allows for a smooth extension because the roller recess grooves 72 found along the second housing 78 are gliding along the rollers 134 placed within each roller system 58.

Once the installer finds the ideal distance, the clip 68 is locked into position between the spaces of the clip locking grooves 74 found on the second housing 78. These spaces are systematically designed to measure ⅖$^{th}$ of an inch along the second housing surface so that the installer can be certain that each measurement will be precise and accurate. At this point, the installer looks at the ruling 60 located along the top surface of the first housing 80 and uses the measuring indicia located on the surface of the second housing to determine the measurement he/she will use for the remainder of the install. If the distance is not long enough, the installer can now extend the third housing 76 by pressing the clip 68 found on the second housing 78 and pulling it out toward the top of the roof for a full extension of the tool like he/she did for the extension of the second housing 78 from the first housing 80. Again, the installer measures the distance and locks the tool into position through a clip 68 and clip locking groove 74.

Advantages

The previously described versions of the present invention have many advantages, including the following:

By having the tool with a roller system the ease of measuring distances on a roof top is increased because the tool adjusts to different measurements without requiring the installer to carry multiple 2×4's. Therefore, the tool 44 increases the safety of the installer because a combination tool eliminates the clutter created on roof tops.

Moreover, the combination tool eliminates the danger created by falling seam clamps because the combination tool holds seam clamps in place and provides a method for installing seam clamps on the rooftop. Additionally, the tool with belt clip attachment secures the tool to the waist of the installer and eliminates the need for holding the tool while walking on the rooftop. Additionally, the clip and locking clip grooves work together with the solar holes located on the housing surface to provide a method for efficiently installing solar clamps onto rooftops. An installer need only insert the roof seam clamp into the tool and place along the corresponding seam that tightens with a slight movement of a seam clamp tightener. Thus, in seconds, a seam clamp is attached to the roof compared to time and danger required for the currently used procedures.

By having the tool with clip locking grooves that correspond to the measuring indicia of the tools surface the risk of inconsistent measurements is eliminated because the tool is locking on precise measurements for use along the roof.

By having the tool with clip locking grooves that correspond to the ruling on the tools surface the risk of inconsistent measurements is eliminated because the tool is locking on precise measurement for use along the roof. Moreover, the consistent measurement will eliminate the possibility of waves in the final product because the distances measured will be locked into place. Furthermore, the cost of installing the systems will be reduced because the installer will not have to redo the install based on the previous problems of waves.

By having an adjustable seam clamp with seam clamp bolt with a large surface area and flat grip tearing through the seams of roofs will be a problem of the past. The presence of a locking pin and pin guide will prevent over tightening and simplify the install process.

By having a clip with locking grooves that locks this tool in place and secures an adjustable seam clamp on its first, second, and third housings the ease of installing seam clamps is improved. An installer will only need one tool to perform a task that ordinarily requires multiple.

CLOSING

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by scope of the attached claim or claims, including the full range of equivalency to which each element thereof is entitled.

The invention claimed is:

1. An apparatus for mounting solar equipment onto a roof, the apparatus comprising:
   a. first, second, and third housings; wherein said third housing is telescopically inserted into said second housing and said second housing is telescopically inserted into said first housing, and where, each housing has a flat bottom with a series of holes on the surface shaped for direct contact with said roof surface;
   b. an adjustable seam clamp;
   c. roller systems, located within the first housing and the second housing, having a roller, a roller assembly, and a roller pin, assembled inside one another, and a roller housing recess, said roller pivotally fastened to said roller assembly via said roller pin inserted into said roller opening and locked into said roller assembly, and said roller system inserted into said roller recess in the first housing and second housing;
   d. roller recess grooves, said roller recess grooves are carved and located longitudinally along said second housing, wherein said second housing has roller recess grooves located along the length of the exterior and positioned adjacently in two's near the first top proximal end, said roller recess grooves singly positioned along the length of the exterior of the second top proximal end, and said roller recess grooves positioned adjacently in two's near the first and second bottom proximal ends and extending to the distal ends; a roller system; the roller system being placed in pairs of two's adjacently along the top proximal end, bottom proximal end, top center, bottom center, and top distal end and bottom distal end of said second housing; a clip secured to the left side of said second housing, clip locking grooves extending from the left side proximal end to the distal end of said second housing;

e. at least two clips adapted to lock said housings, located distally and adjacent to a top surface of said first housing and said second housing, having a pivot pin, a pivot nut, at least one spring guide and a series of clip springs, said clip pivotally fastened to the first housing and the second housing via said pivot pin entered through said clip and secured by said pivot nut on the top surface of the first housing and the second housing, said clip springs located between the clip and directed by said spring guides on the clip and on the first housing and second housing, wherein the clip being depressed and in static position creates a constant tension, said clip inserted into first said housing and second said housing so that it locks into the second housing and a third housing;

f. a series of clip locking grooves, said clip locking grooves affixed to said second housing and said third housing, the clip locking grooves evenly spaced lengthwise along the second housing and said third housing, wherein the clip locking grooves are engageable when the clip is in a static position;

g. at least one safety line attachment recess carved into a housing;

h. at least one belt clip attached to the first housing left side;

i. at least one rubber coating along the surface of at least one housing;

j. at least one holder milled into the first housing, second housing or third housing;

k. at least one level connected to first housing, said level centered on the top surface of said first housing;

l. rulings etched along the top surface of the first housing, second housing, and third housing, said rulings can be read at the junction of the first housing and the second housing to determine the distance between the end of the first housing and a point on the second housing, and the end of the first housing and a point on the third housing;

m. a series of holes milled lengthwise along the bottom center and right center side of said first housing, at least one of said holes on the bottom center and right center side of said second housing, and at least one of said holes on the bottom center and right center side of said third housing, wherein said series of holes can engage and secure said adjustable seam clamp;

n. an adjustable seam clamp fixable to said first housing, said second housing, and said third housing, said adjustable seam clamp consisting of a predetermined shape, a roof seam clamp tightener and grip, a tightening fastener, a roof seam clamp main housing, a seam clamp to ruler bolt, and a rotation locking pin bearings, said tightening fastener inserted into said roof seam clamp tightener and grip, said roof seam clamp tightener and grip connected to said roof seam clamp main housing via said tightening fastener and said tightening lever so that it tightens or loosens said tightener and grip against a seam of a roof, said seam clamp to ruler bolt joined to said main housing via said rotation locking pin bearings though said locking pin guide hole into said apparatus for installing an adjustable seam clamp onto a standing seam roof;

o. an elongating device secured onto one of said housings.

2. Apparatus according to claim 1, wherein said housing includes a series of holes for receiving one or more seam clamps.

3. Apparatus according to claim 1, wherein an elongating device includes a ruler slide lock attachment that is insertable into a selected housing slide in seam from below and thereafter is snapped to a locked position on said housing.

4. Apparatus according to claim 1, wherein said seam clamp is received by said series of holes and is attached to said standing seam of a roof through said tightener and grip so as to secure the seam clamp in addition to securing a rail.

5. A system for installing an adjustable seam clamp onto a standing seam roof, said adjustable seam clamp supported by a housing, said housing having a flat surface and a series of holes along said housing, comprising:

a. first, second, and third housings; wherein said third housing is telescopically inserted into said second housing and said second housing is telescopically inserted into said first housing, and where, each housing has a flat bottom with a series of holes on the surface shaped for direct contact with said roof surface;

b. an adjustable seam clamp;

c. roller systems, located within the first housing and the second housing, having a roller, a roller assembly, and a roller pin, assembled inside one another, and a roller housing recess, said roller pivotally fastened to said roller assembly via said roller pin inserted into said roller opening and locked into said roller assembly, and said roller system inserted into said roller recess in the first housing and second housing;

d. roller recess grooves, said roller recess grooves are carved and located longitudinally along said second housing, wherein said second housing has roller recess grooves located along the length of the exterior and positioned adjacently in two's near the first top proximal end, said roller recess grooves singly positioned along the length of the exterior of the second top proximal end, and said roller recess grooves positioned adjacently in two's near the first and second bottom proximal ends and extending to the distal ends; a roller system; the roller system being placed in pairs of two's adjacently along the top proximal end, bottom proximal end, top center, bottom center, and top distal end and bottom distal end of said second housing; a clip secured to the left side of said second housing, clip locking grooves extending from the left side proximal end to the distal end of said second housing;

e. at least two clips adapted to lock said housings, located distally and adjacent to a top surface of said first housing and said second housing, having a pivot pin, a pivot nut, at least one spring guide and a series of clip springs, said clip pivotally fastened to the first housing and the second housing via said pivot pin entered through said clip and secured by said pivot nut on the top surface of the first housing and the second housing, said clip springs located between the clip and directed by said spring guides on the clip and on the first housing and second housing, wherein the clip being depressed and in static position creates a constant tension, said clip inserted into first said housing and second said housing so that it locks into the second housing and a third housing;

f. a series of clip locking grooves, said clip locking grooves affixed to said second housing and said third housing, the clip locking grooves evenly spaced lengthwise along the second housing and said third housing, wherein the clip locking grooves are engageable when the clip is in a static position;

g. at least one safety line attachment recess carved into a housing;
h. at least one belt clip attached to the first housing left side;
i. at least one rubber coating along the surface of at least one housing;
j. at least one holder milled into the first housing, second housing or third housing;
k. at least one level connected to first housing, said level centered on the top surface of said first housing;
l. rulings etched along the top surface of the first housing, second housing, and third housing, said rulings can be read at the junction of the first housing and the second housing to determine the distance between the end of the first housing and a point on the second housing, and the end of the first housing and a point on the third housing;
m. a series of holes milled lengthwise along the bottom center and right center side of said first housing, at least one of said holes on the bottom center and right center side of said second housing, and at least one of said holes on the bottom center and right center side of said third housing, wherein said series of holes can engage and secure said adjustable seam clamp;
n. an adjustable seam clamp fixable to said first housing, said second housing, and said third housing, said adjustable seam clamp consisting of a predetermined shape, a roof seam clamp tightener and grip, a tightening fastener, a roof seam clamp main housing, a seam clamp to ruler bolt, and a rotation locking pin bearings, said tightening fastener inserted into said roof seam clamp tightener and grip, said roof seam clamp tightener and grip connected to said roof seam clamp main housing via said tightening fastener and said tightening lever so that it tightens or loosens said tightener and grip against a seam of a roof, said seam clamp to ruler bolt joined to said main housing via said rotation locking pin bearings though said locking pin guide hole into said apparatus for installing an adjustable seam clamp onto a standing seam roof;
o. a means for elongating an apparatus for installing a seam clamp on a roof at a distal end of said apparatus so as to be able to measure longer distances for installations and secure said apparatus on roof tops
whereby said adjustable seam clamp is mounted to said flat surface.

6. The system according to claim 1, further comprising at least one static housing, wherein said static housing is centralized and operatively connected to said moveable housing.

7. A system as claimed in claim 1, in which said flat surface is a roof.

8. A method for installing a seam clamp with a solar equipment installer to a roof comprising:
securing said seam clamp to said installer via inserting a pin structure of a seam clamp into the solar equipment installer immediately before laying the installer flat against a roof such that the installation of the seam clamp onto a standing seam roof can be performed by rotating a seam clamp tightening lever up while the solar equipment installer is in a locked position.

9. The method of claim 8 wherein said seam clamps are attached to said installer following laying said installer onto the roof.

10. The method of claim 8 further comprising installing a rail on said standing seam roof following the installation of said seam clamp onto said roof.

11. The method of claim 8 further comprising installing an L-bracket on said standing seam roof following the installation of said seam clamp onto said roof.

* * * * *